United States Patent
Yotoriyama

(10) Patent No.: US 6,623,359 B1
(45) Date of Patent: Sep. 23, 2003

(54) GAME MACHINE AND INFORMATION STORAGE MEDIUM

(75) Inventor: Hiroaki Yotoriyama, Tokyo (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/446,598

(22) PCT Filed: Apr. 23, 1999

(86) PCT No.: PCT/JP99/02169

§ 371 (c)(1),
(2), (4) Date: Feb. 2, 2000

(30) Foreign Application Priority Data

Apr. 24, 1998 (JP) ............................................. 10-131180

(51) Int. Cl.[7] ................................................. A63F 9/22
(52) U.S. Cl. ........................................... 463/36; 463/43
(58) Field of Search ........................ 463/30–32, 37–38, 463/43–44, 36

(56) References Cited

U.S. PATENT DOCUMENTS

| | | | | |
|---|---|---|---|---|
| 5,329,276 A | * | 7/1994 | Hirabayashi ............ 340/870.31 |
| 5,624,117 A | * | 4/1997 | Ohkubo et al. .......... 273/148 B |
| 5,720,663 A | * | 2/1998 | Nakatani et al. ............... 463/23 |
| 5,738,352 A | * | 4/1998 | Ohkubo et al. .......... 273/148 B |
| 5,854,622 A | * | 12/1998 | Brannon ...................... 345/161 |
| 5,868,620 A | * | 2/1999 | Wada et al. ................... 463/38 |
| 5,929,844 A | * | 7/1999 | Barnes ........................ 345/156 |
| 5,947,819 A | * | 9/1999 | Ohshima ........................ 463/2 |
| 5,947,823 A | * | 9/1999 | Nimura ........................ 463/32 |
| 6,154,197 A | * | 11/2000 | Watari et al. ............... 345/161 |

FOREIGN PATENT DOCUMENTS

| | | |
|---|---|---|
| JP | A-8-182860 | 7/1996 |
| JP | A-11-53570 | 2/1999 |
| JP | A-11-76616 | 3/1999 |

* cited by examiner

Primary Examiner—S. Thomas Hughes
Assistant Examiner—Carmen D. White
(74) Attorney, Agent, or Firm—Oliff & Berridge, PLC

(57) ABSTRACT

An objective of the present invention is to provide a three-dimensional action game machine in which three-dimensional actions of game characters can be realized through a simple input system and an information storage medium suitable for use therein. The game machine has a plurality of input modes including a two-dimensional action mode (or first input mode), a three-dimensional step action mode (or second input mode) and a three-dimensional running mode (or second input mode). By switching the input mode, actions of the game character in the three-dimensional space can be inputted. If a lever is manipulated two times in the same direction within a predetermined time period and held at the manipulated position, the game machine enters the three-dimensional running mode wherein the game character can freely move about on the plane in the three-dimensional space.

21 Claims, 19 Drawing Sheets

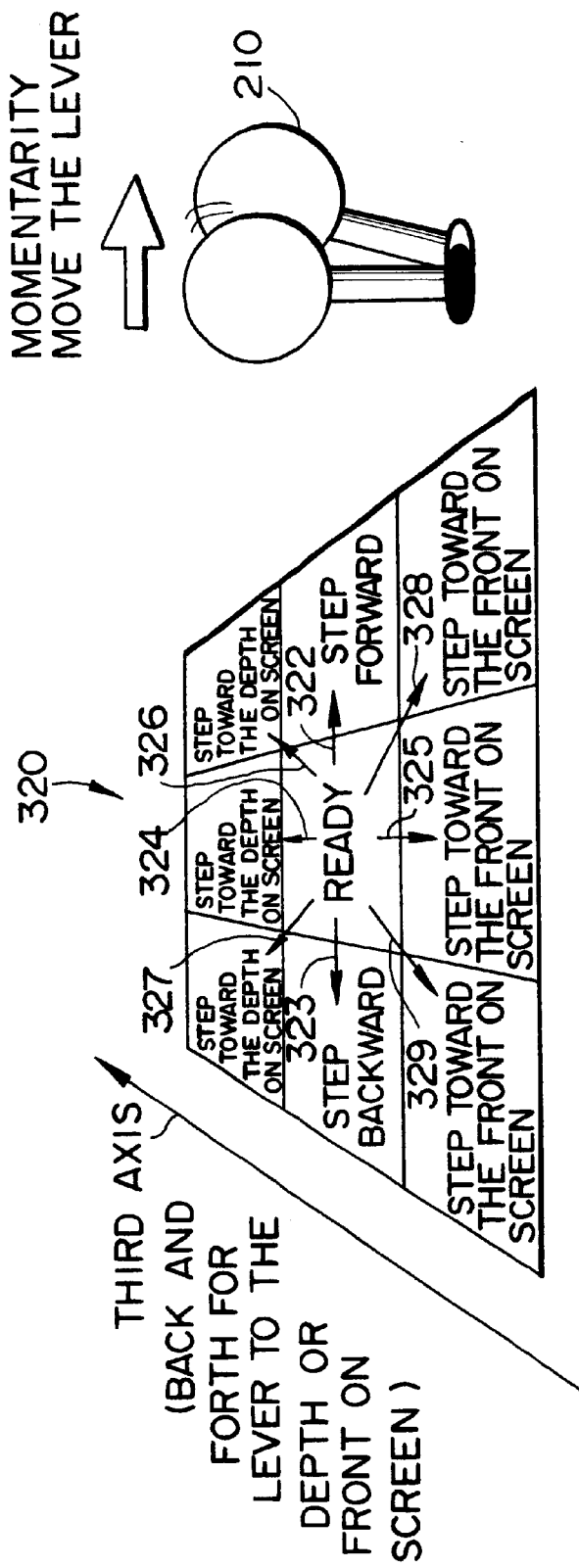

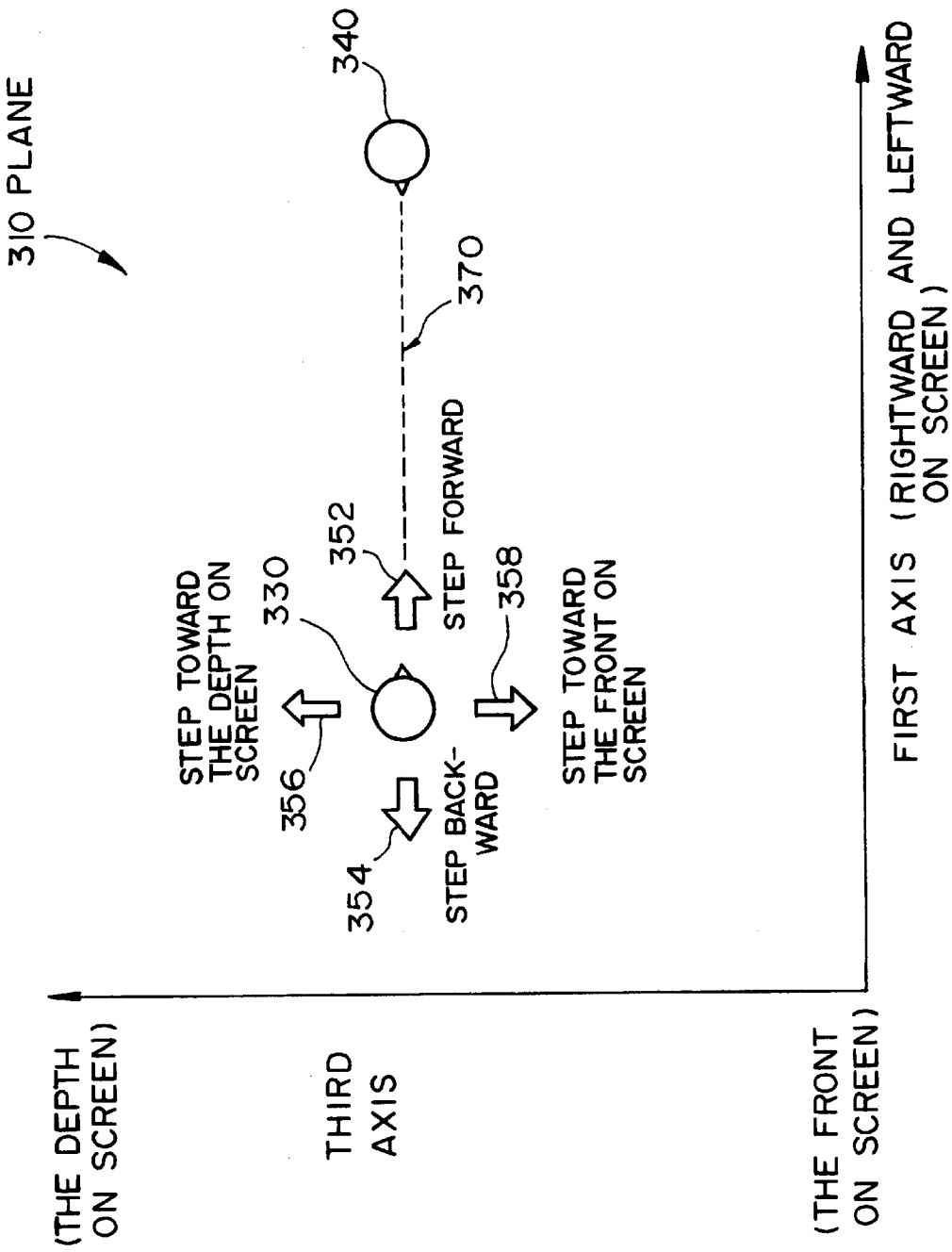

FIG. 10A

- RUN LEFT FORWARD 424
- RUN FORWARD 422
- RUN RIGHT FORWARD 426
- RUN LEFTWARD 427
- RUN RIGHTWARD 428
- RUN LEFT BACKWARD 423
- RUN BACKWARD 429
- RUN RIGHT BACKWARD 425

420

THIRD AXIS (BACK AND FORTH FOR LEVER TOWARD THE DEPTH OR FRONT ON SCREEN)

FIRST AXIS (RIGHTWARD AND LEFTWARD FOR LEVER RIGHTWARD AND LEFTWARD ON SCREEN)

FIG. 10B

MOMENTARILY MOVE THE LEVER

MOVE LEVER AGAIN IN THE SAME DIRECTION AND HOLD LEVER AT THAT POSITION

210

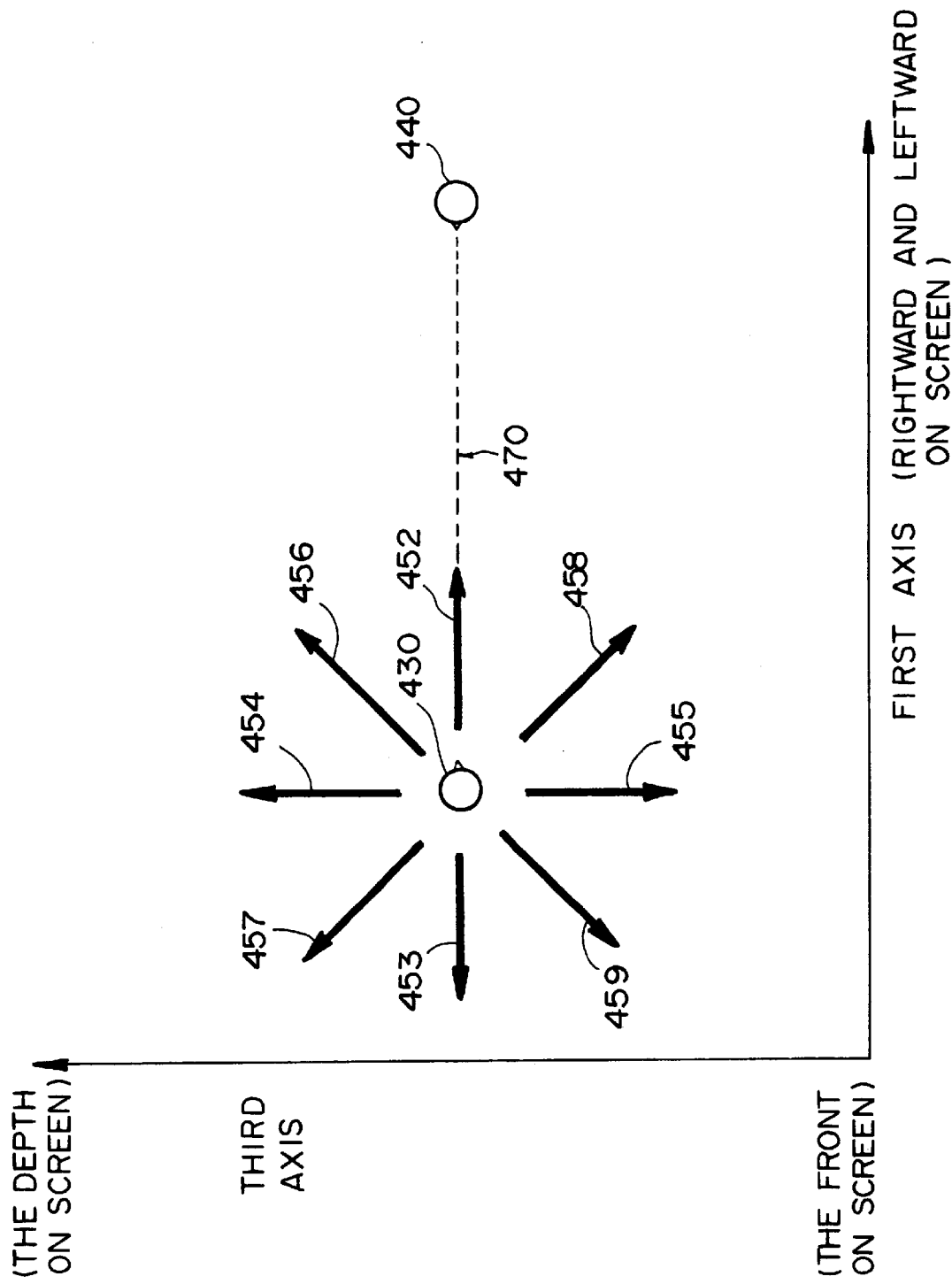

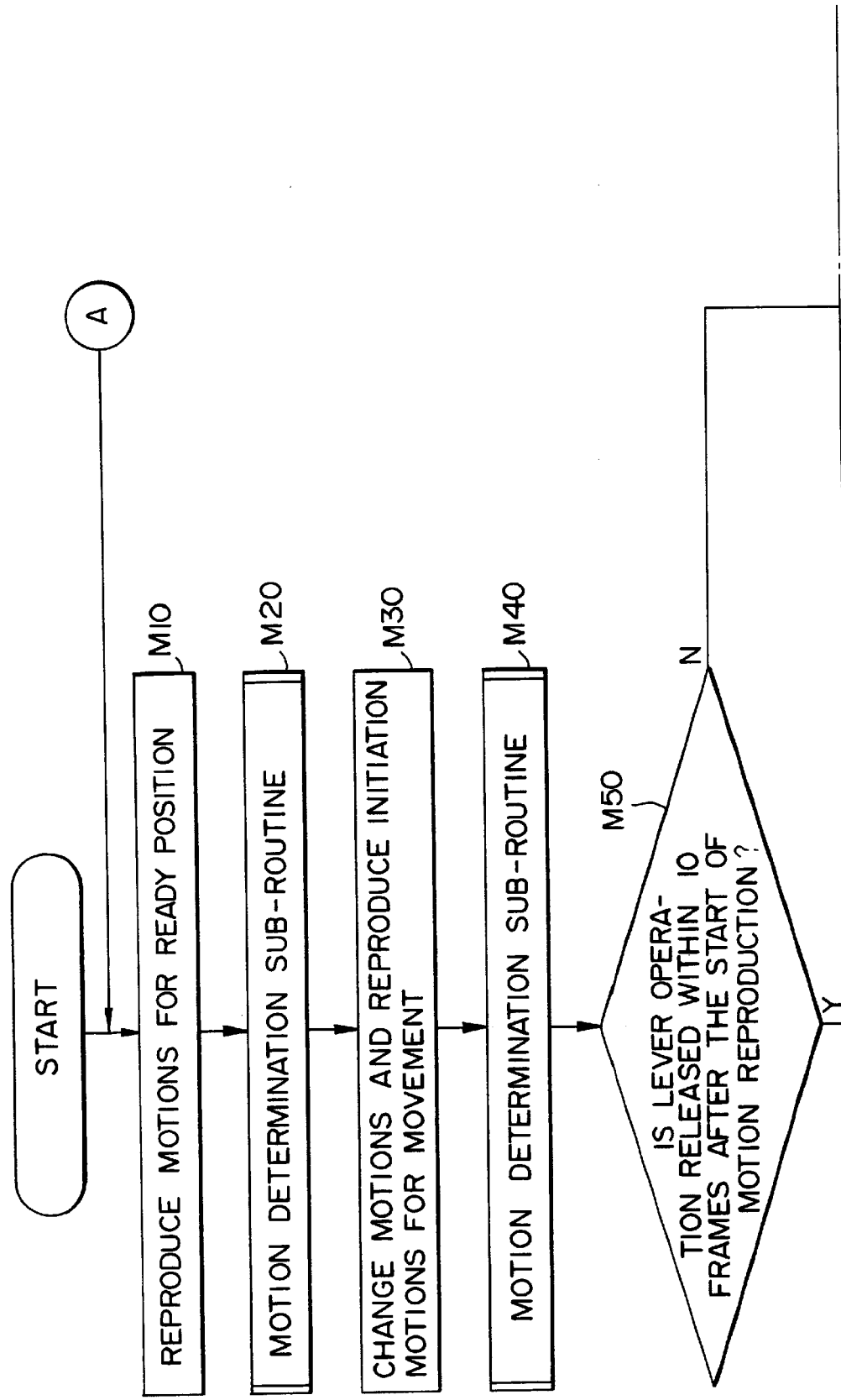

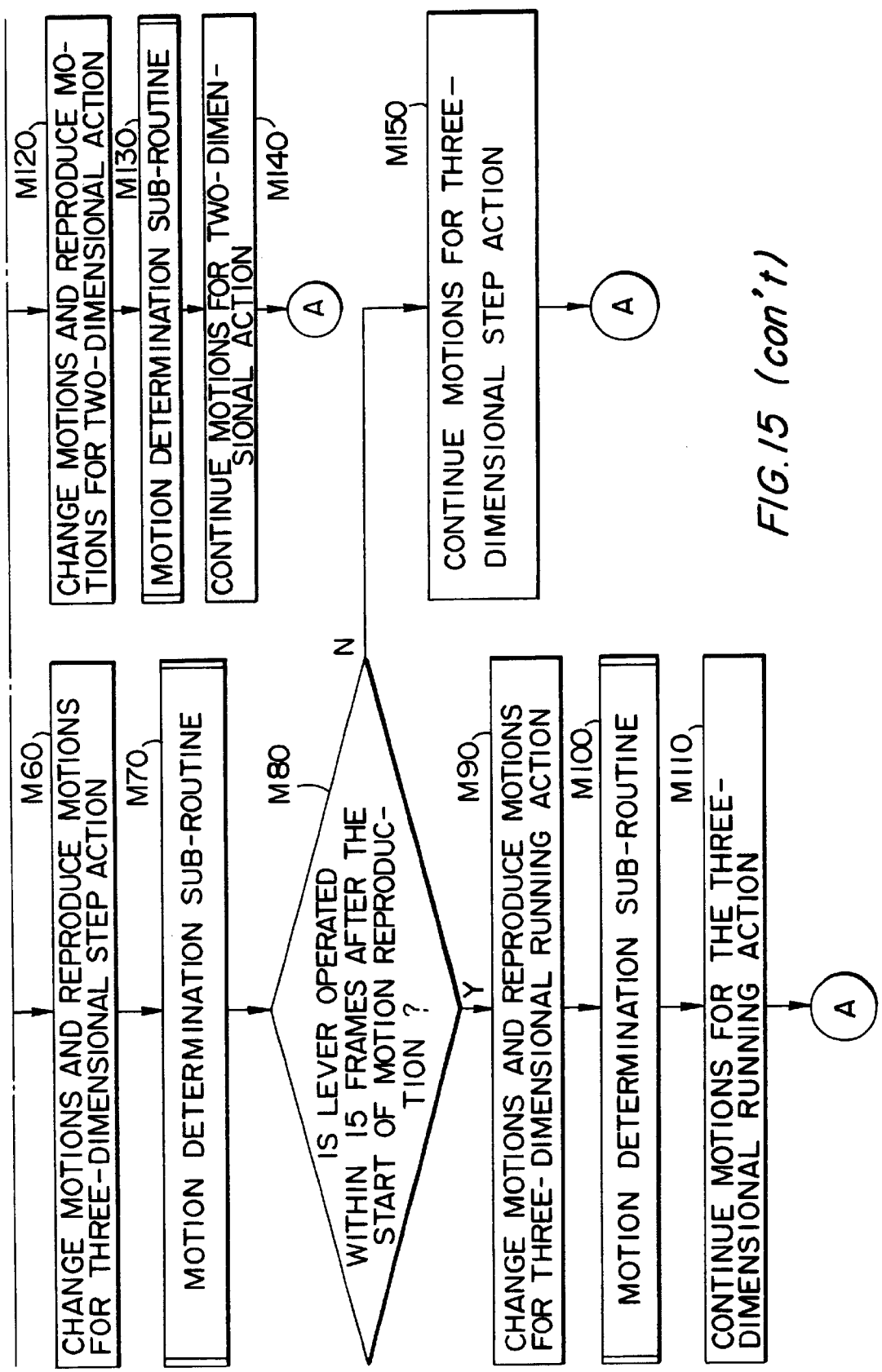
FIG.15 (con't)

GAME MACHINE AND INFORMATION STORAGE MEDIUM

TECHNICAL FIELD

The present invention relates to a game machine for playing a game in which game characters move in a three-dimensional space and an information storage medium suitable for such a game machine.

BACKGROUND OF ART

In the prior art, fighting games and the like adopt a two-dimensional action wherein movement of game characters is limited substantially in a two-dimensional plane. For example, as a player manipulates an operating lever back and forth, a game character moves back and forth relative to an enemy's game character (or rightward and leftward on the screen). As the player manipulates the lever up or down, the game character jumps up or crouches.

In such a two-dimensional action type of fighting game, the offense and defense tend to be simple since movement of the game characters is restricted. Also, there is not such a concept that a player performs the offense and defense while obtaining an advantageous position over an enemy in a conventional two-dimensional action type of fighting game.

Therefore, the applicant has developed a three-dimensional action type of fighting game machine in which game characters can freely be moved in fight within a three-dimensional space, enabling the game characters to obtain advantageous positions for performing real, variable and complicated movements in defense and offense. In this three-dimensional action type of fighting game machine, game characters can be moved not only in horizontal and vertical directions, but also toward the depth and the front on the game screen. Thus, it is necessary to provide input means for moving game characters in the directions of the depth and the front on the game screen.

In this case, if a completely new input system is adopted, a player who is familiar with the operation of the two-dimensional action type of input system of the prior art has to learn a new operational technique. The player's skill cannot be effectively utilized, and so the player tends to lose interest in the new three-dimensional action type of fighting game.

The fighting games usually require a complicated operation for offense and defense. If a new input system for moving game characters in the three-dimensional space is added, operation will be more complicated. It is thus necessary to provide a simple input system for moving game characters.

DISCLOSURE OF THE INVENTION

It is therefore an objective of the present invention to provide a three-dimensional action type of game machine which can realize a three-dimensional action of a game character through a simple input system and an information storage medium suitable for use therein.

To this end, the present invention provides a game machine for a game in which a plurality of game characters including. first and second game characters can move in a three-dimensional space specified by three axes, that is, first, second and third axes. This game machine comprises: action input means which has a plurality of input modes including first and second input modes and inputs an action of the game characters by changing an input mode; action-computation means for computing movement of the game characters in the directions of the first and second axes based on an input from the action input means in the first input mode, and for computing movement of the game characters in the directions of the first and third axes based on an input from the action input means in the second input mode; and image generation means for generating an image to be displayed on a display section based on movement of the game characters computed by the action computation means.

The present invention also provides an information storage medium including information for realizing the above-described means.

The term "action" used herein is intended to include movement of the game characters.

The action input means may be any means if it can input two-dimensional directions on a plane specified by two axes, including a lever, a button, a mouse or the like.

The action input means of the present invention has a plurality of input modes including first and second input modes and can input the action of the game character by switching the input mode. In the first input mode, actions in the directions of the first and second axes can be inputted. In the second input mode, actions in the directions of the first and third axes can be inputted.

According to the present invention, a game character can freely be moved in a three-dimensional space by dividing the action of the game character in the three-dimensional space into motions on a plane specified by two axes, and by inputting these motions in each of the input modes.

Input of the directions of movement on a plane specified by two axes was adopted in the prior art game machines. So this can easily be understood by any ordinary player in feel. Since the action input means can input actions in the plural input modes, various actions may be inputted by less operations.

According to the present invention, thus, there can be provided a game machine in which any complicated action of a game character within a three-dimensional space can be inputted by combination of simple operations.

The action computation means may judge the input mode based on whether or not the time required to perform one operation in the action input means is within a given time period.

The information storage medium of the present invention may further include information for realizing the above-described feature.

The present invention does not require any special operating section for instructing the switching of the input mode since the input mode is judged based on the operating time. Thus, the game machine can have a simple input system for switching the input mode.

The action computation means may judge the input mode based on whether or not a predetermined operation is performed within a predetermined time period in the action input means.

The information storage medium of the present invention may further include information for realizing above-described feature.

The present invention does not require any special operating section for instructing the switching of the input mode since the input mode is judged based on whether or not a predetermined operation is performed within a predetermined time period. Thus, the game machine can have a simple input system for switching the input mode.

The first axis may be set based on a positional relationship between the first and second game characters; and each of the second and third axes may be set to be perpendicular to the first axis.

The information storage medium according to the present invention may further include information for realizing the above-described feature.

Setting the first axis based on the positional relationship between the first and second game characters means that, for example, setting the first axis based on the direction connecting the first and second characters.

It is usually difficult to know the positional relationship between the game characters moving in the three-dimensional space, but the player has to determine the direction in which the game character is moved in order to approach the other game character, for example. According to the present invention, by setting the first axis based on the positional relationship between the two game characters, it becomes easy to know the positional relationship between the game characters. In other words, when the first axis is set based on the direction along a line connecting the first and second game characters, the game character can approach the other game character by moving along the first axis.

According to the present invention, as described, a game machine which can be manipulated in a simple manner to move the game characters even if the player is not familiar with that game machine can be provided, since the positional relationship between the game characters can be easily understood by the player.

Moreover, the first axis may be set based on horizontal directions on the screen of the display section; the second axis may be set based on vertical directions on the screen of the display section; and the third axis may be set based on the directions of the depth and the front on the screen of the display section.

The information storage medium of the present invention may further include information for realizing the above-described feature.

Thus, there may be provided a game machine which can easily be understood and manipulated by a player, since the directions of movement on the screen are identical with the operational directions.

The image generation means may generate an image by switching data of motions based on the change of the input mode.

The information storage medium according to the present invention may further include information for realizing the above-described feature.

According to the present invention, images representing various actions of the game characters in the three-dimensional space can be generated without increase of the load required for computation, since the data of motions is changed based on the change of the input mode.

In the game machine of the present invention, a game in which the first and second game characters fight against each other may be played; the action input means may input movement of a game character in vertical, forward and backward directions including advance to and retreat from the other game character in the first input mode; and the action input means may input movement of a game character on a plane in the three-dimensional space in the second input mode.

The information storage medium according to the present invention may further include information for realizing the above-described feature.

The movement of the game character in vertical directions include jump and crouching, for example.

The two-dimensional action type of fighting game of the prior art has an arrangement for inputting movement of a game character in vertical directions including jump and crouching and movement in horizontal directions including advance and retreat relative to another game character on a game screen as a plane for moving.

According to the present invention, the input operation as in the prior art can be performed in the first input mode and the movement of the game character on the plane in the three-dimensional space can be inputted in the second input mode. Thus, the player can input movement of the game character by using the input mode for the two-dimensional action of the prior art and the second input mode.

Therefore, any player skilled in the conventional two-dimensional action type of fighting game can enjoy a three-dimensional type of fighting game of higher level, utilizing his or her skilled technique.

The game machine of the present invention may further comprise second action input means for inputting an action of a game character, wherein the second action input means inputs at least one of jump, crouching, attack and defense actions of a game character in the second input mode.

The information storage medium according to the present invention may further include information for realizing the above-described feature.

According to the present invention, the game character can perform at least one of jump, crouching, attack and defense actions while moving on the plane in the three-dimensional space. In the fighting game, therefore, the game character can perform its offence or other actions after ensuring the advantageous position by freely moving in the three-dimensional space. Thus, the present invention can provides a fighting game machine in which the game character can fight against the other game character after ensuring its advantageous position in the three-dimensional space.

The action input means may be a lever which can be manipulated at least forward, backward, rightward and leftward directions or can be manipulated pivotally.

By use of such a lever, the input can be performed in the forward, backward, rightward and leftward directions or in any direction through 360 degrees so that the game character can easily be moved in any specified direction.

BRIEF DESCRIPTION OF THE DRAWINGS

FIGS. 8A and 8B illustrate the relationship and the lever operation and movement of the game character in the three-dimensional step action mode.

FIG. 9 illustrates the relationship between movement of the game character and directions on the screen in the three-dimensional step action mode.

FIGS. 10A, 10B and 10C illustrate the relationship between the lever operation and movement of the game character in the three-dimensional running mode.

FIG. 11 illustrates the relationship between movement of the game character and directions on the screen in the three-dimensional running mode.

FIG. 15 is a flowchart illustrating an example of processing in the embodiment of the present invention.

BEST MODE FOR CARRYING OUT THE INVENTION

The present invention will now be described with reference to the drawings. Although the present invention is described herein as to a fighting game, the present invention is not limited to such a fighting game, but may equivalently be applied to any of various other type of games.

1. Arrangement of Game Machine

Figure 1:
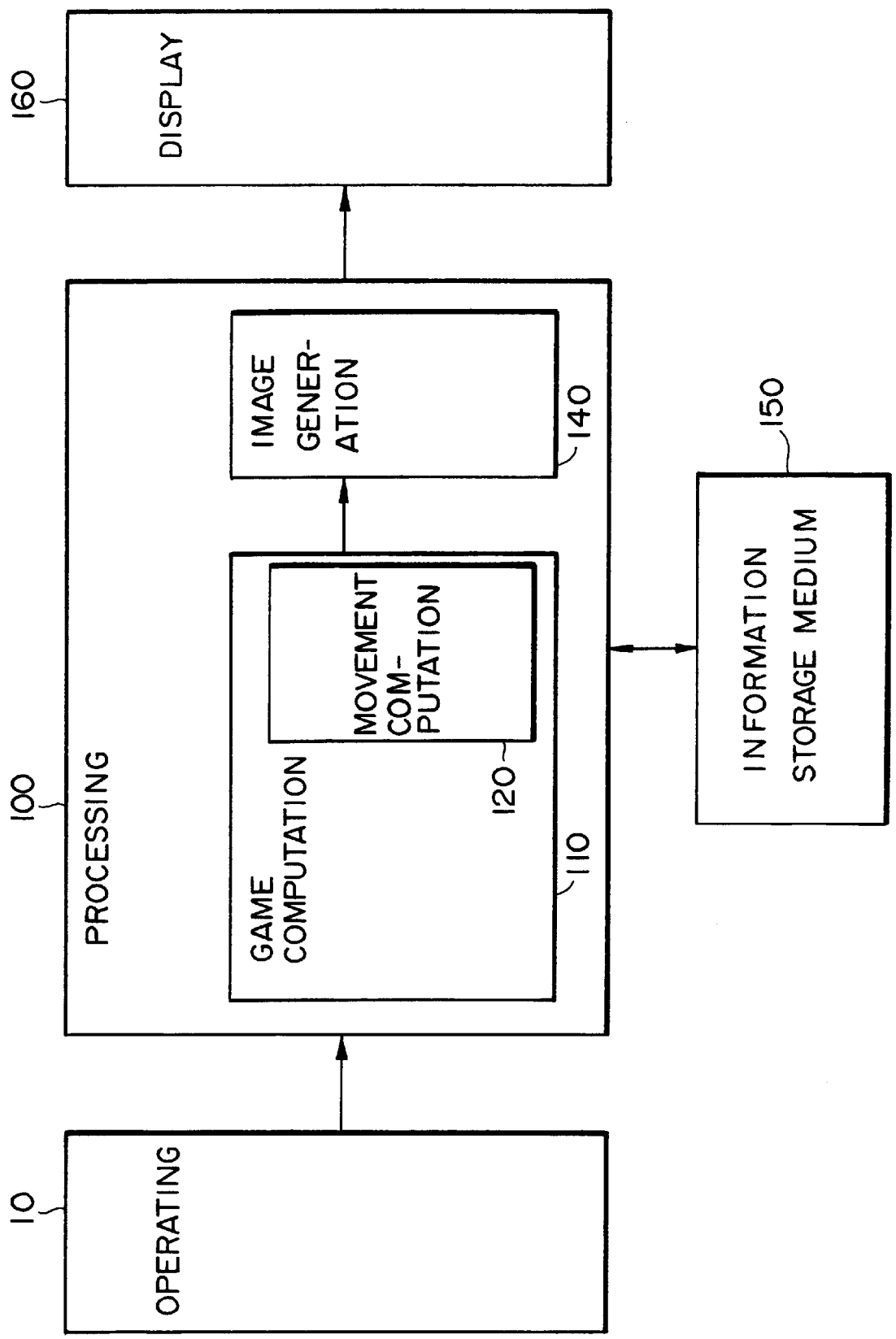
FIG. 1 is a functional block diagram of a game machine according to one embodiment of the present invention.

FIG. 1 is a functional block diagram of a game machine according to the embodiment of the present invention. Referring to FIG. 1, an operating section 10 is designed for a player to input operational information for a game character by manipulating a lever, buttons and others. The operational information from the operating section 10 is sent to a processing section 100. The lever in the operating section 10 functions as action input means for inputting actions of a game character while selectively switching a plurality of input modes including first and second input modes. The buttons and others function as second action input means for determining actions such as offense and defense by a game character.

The processing section 100 generates an image as seen from a given viewpoint within an object space in which a plurality of objects used to represent things to be displayed are arranged, by use of the operational information and according to a given program. The function of the processing section 100 may be accomplished by any suitable structure of hardware such as CPU (CICS type or RISC type), DSP, ASIC (gate array or the like) or memory.

An information storage medium 150 is provided to store a program and data. The function of the information storage medium 150 may be accomplished by any suitable structure of hardware such as CD-ROM, game cassette, IC card, MO, FD, DVD, memory or hard disc. The processing section 100 will perform various processing based on the program and data in the information storage medium 150.

The processing section 100 comprises a game computation section 110 and an image generation section 140.

The game computation section 110 performs various processing such as setting the game mode, moving the game forward, determining the position, direction and action of the game character, and determining the viewpoint information. The game computation section 110 includes a movement computation section 120 which computes movement of the game character in the directions of first and second axes based on an input from the operational lever in the first input mode, and computes movement of the game character in the directions of first and third axes based on an input from the lever in the second input mode.

The image generation section 140 generates an image as seen from a virtual camera placed at a given point in the object space. The image generated by the image generation section 140 is displayed on a display section 160.

2. Features of this Embodiment

The game machine of this embodiment is characterized by that a plurality of input modes including two-dimensional action mode (or first input mode), three-dimensional step action mode (or second input mode) and three-dimensional running mode (or second input mode) can be used and that the game character can freely move about on the plane in the three-dimensional space in that three-dimensional running mode.

Figure 2:
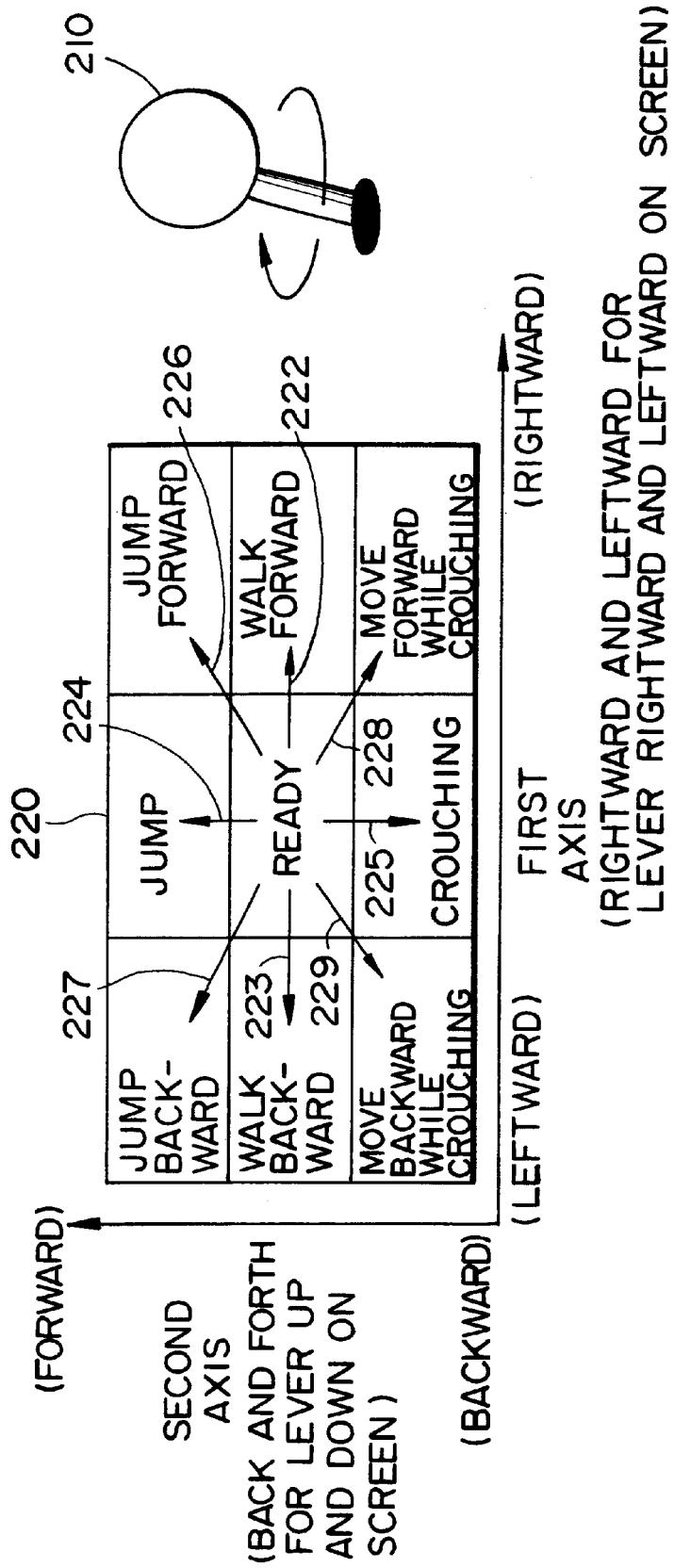
FIGS. 2A and 2B illustrate the relationship between the lever operation and movement of the game character in the two-dimensional action mode.
Figure 3:
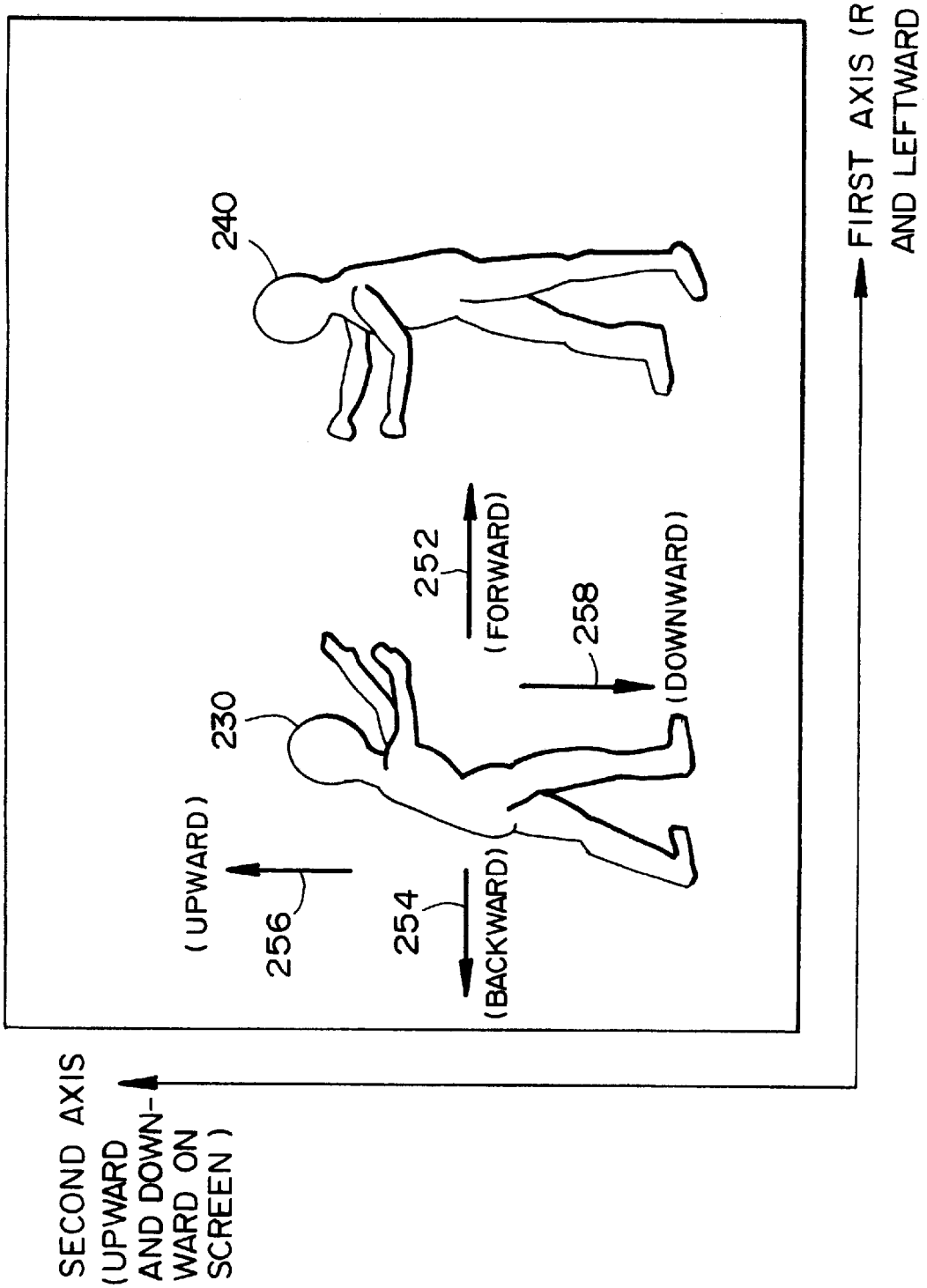
FIG. 3 illustrates the relationship between movement of the game character and directions on the screen in the two-dimensional action mode.

The two-dimensional action mode (or first input mode) will first be described with reference to FIG. 2A to FIG. 7C. FIGS. 2A and 2B illustrate the relationship between the lever operation and movement of the game character in the two-dimensional action mode; FIG. 3 illustrates the relationship between movement of the game character and directions on the game screen; and FIGS. 4, 5A, 5B, 5C, 5D, 6A, 6B, 6C, 7A, 7B and 7C illustrate motions of the game character. In the two-dimensional action mode, the game character is moved in horizontal and vertical directions on the game screen shown in FIG. 3, similar to the two-dimensional action of the prior art.

A lever 210 shown in FIG. 2B is pivotable through 360 degrees by manipulation of the player. A table 220 in FIG. 2A shows the relationship between the direction of lever operation and actions of the game character. Arrows 222 to 229 in the table 220 indicate the directions of lever operation by the player.

Figure 4:
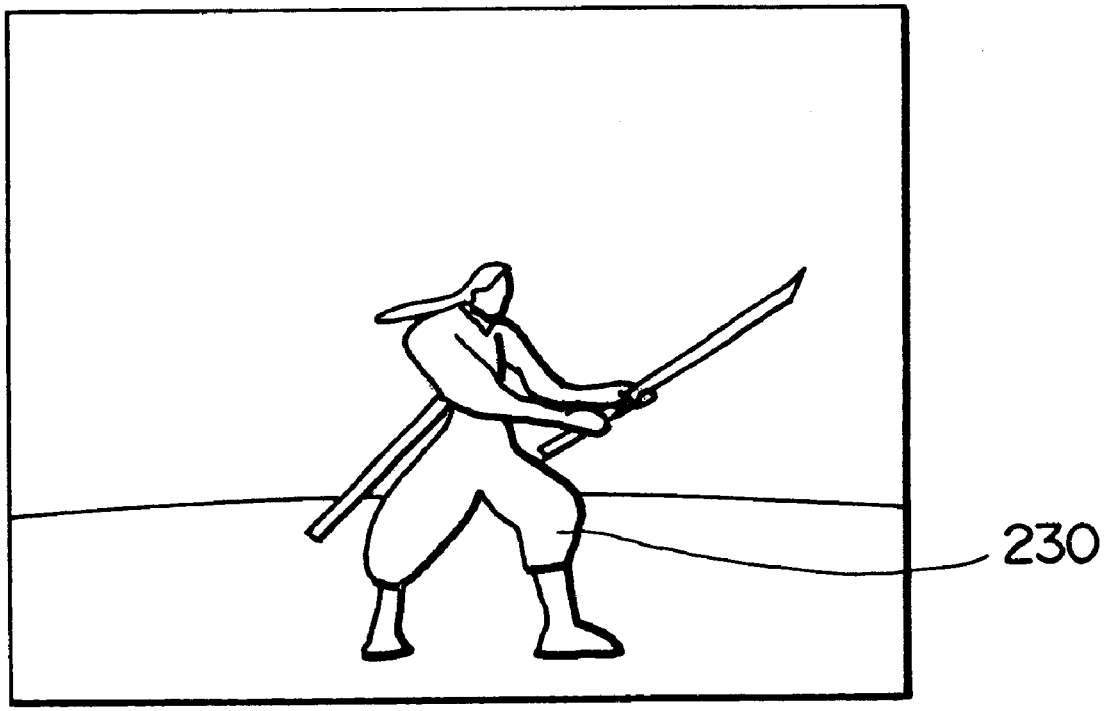
FIG. 4 illustrates motions of the game character.
Figure 5A:
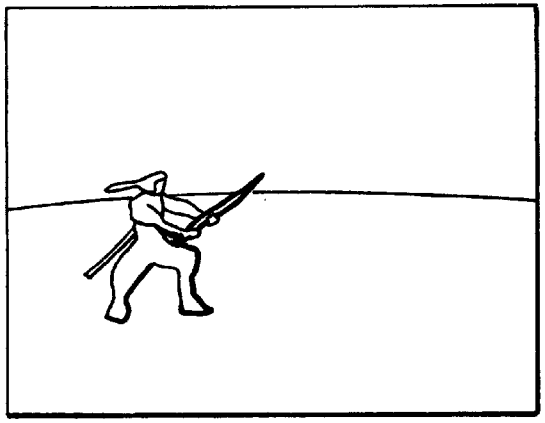
FIGS. 5A, 5B, 5C and 5D illustrate motions of the game character.
Figure 5B:
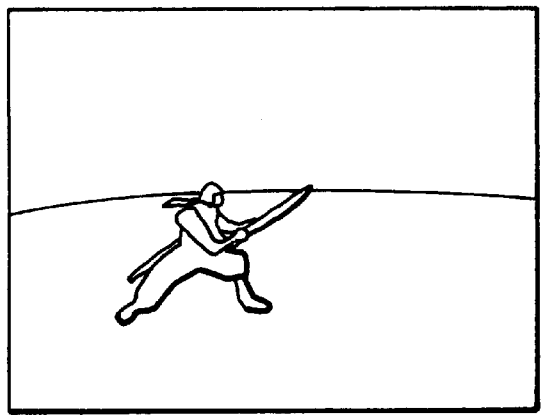
Figure 5C:
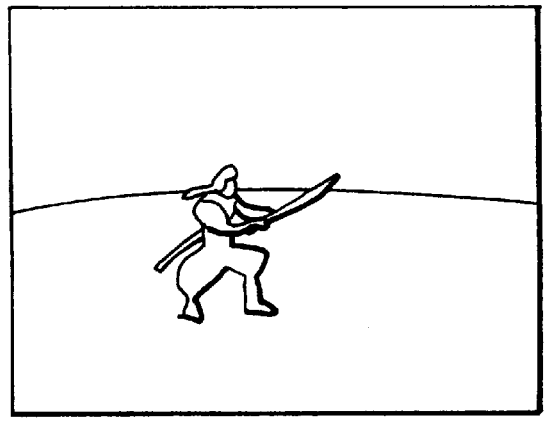
Figure 5D:
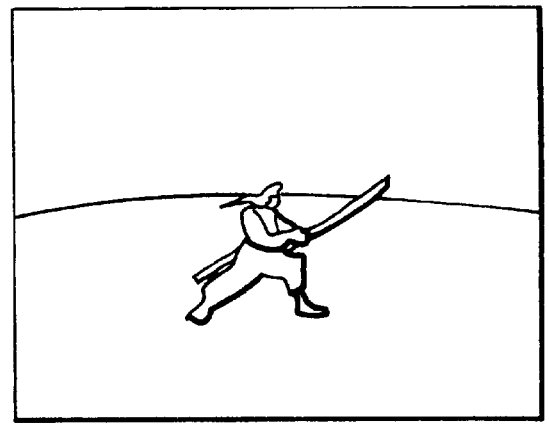

In the neutral position of the lever 210, a game character 230 is at the ready, as shown in FIG. 4.

As the lever 210 is moved in the rightward direction (222), the game character 230 walks forward with such motions as shown in FIGS. 5A, 5B, 5C and 5D. The term "forward" herein means a direction (252) toward an enemy game character 240, that is, rightward on the game screen of FIG. 3. On the contrary, as the lever 210 is moved leftward (223), the game character 230 walks backward. The term "backward" herein means a direction (254) away from the enemy game character 230, that is, leftward on the game screen of FIG. 3.

Figure 6A:
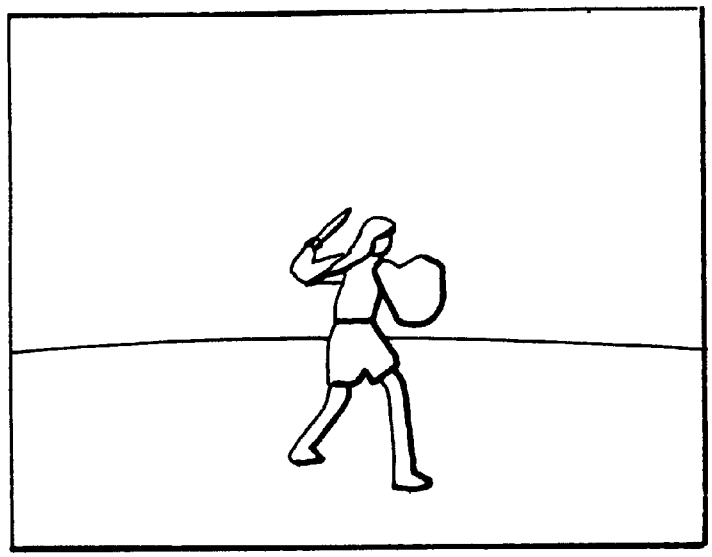
FIGS. 6A, 6B and 6C illustrate motions of the game character.
Figure 6B:
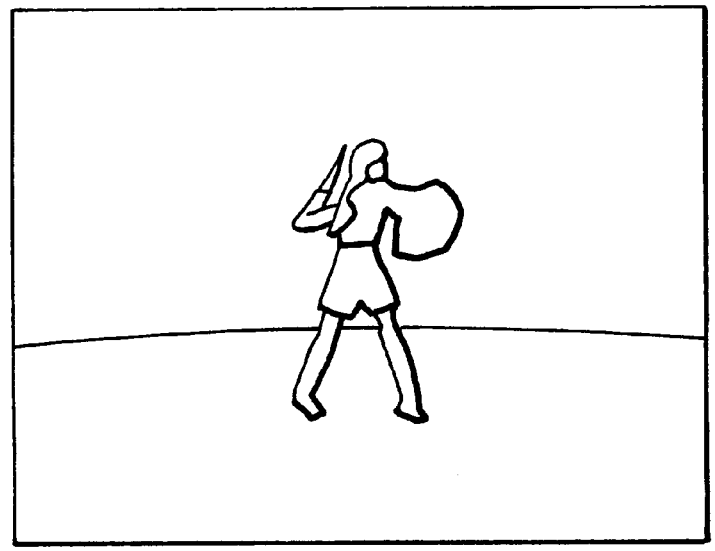
Figure 6C:
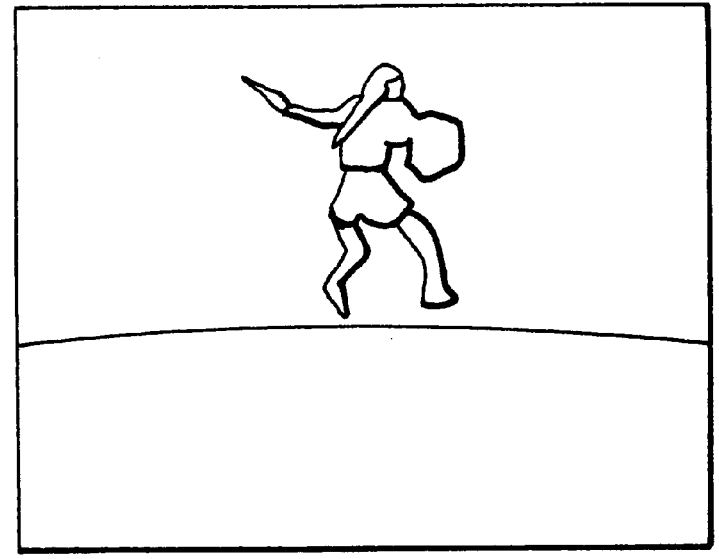
Figure 7A:
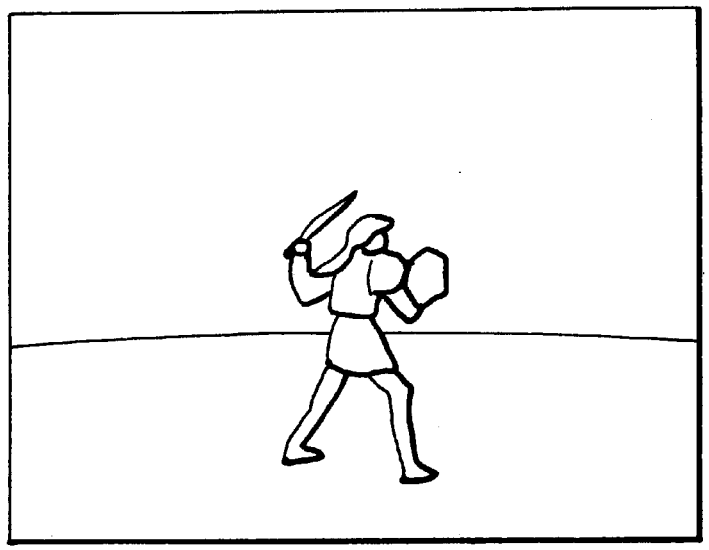
FIGS. 7A, 7B and 7C illustrate motions of the game character.
Figure 7B:
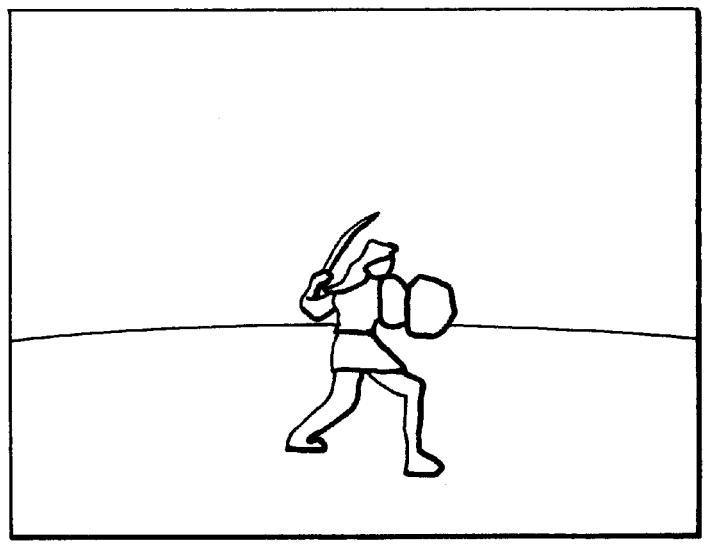
Figure 7C:
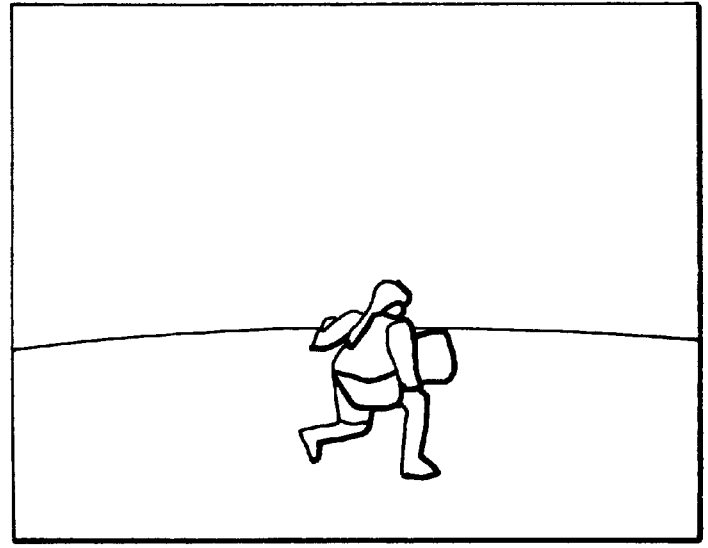

As the lever 210 is moved forward (224) (or as the lever is tilted in the opposite direction to the player), the game character 230 jumps up with such motions as shown in FIGS. 6A, 6B and 6C. In this case, the game character momentarily moves upward (256) on the game screen of FIG. 3. On the other hand, as the lever 210 is moved backward (225) (or as the lever is tilted toward the player), the game character 230 crouches with such motions as shown in FIGS. 7A, 7B and 7C. In this case, the game character momentarily moves downward (258) on the game screen of FIG. 3.

As the lever 210 is moved in the right forward direction (226), the game character jumps forward. As the lever 210 is moved in the left forward direction (228), the game character jumps backward. As the lever 210 is moved in the right backward direction (228), the game character crouches and moves forward. As the lever 210 is moved in the left backward direction (229), the game character crouches and moves backward.

In such a manner, the two-dimensional action mode (or first input mode) enables the game character to perform actions according to the directions on the monitor screen. In other words, the rightward or leftward operation of the lever moves the game character rightward or leftward on the game screen. The forward or backward operation of the lever moves the game character in the upward or downward direction on the game screen.

In this embodiment, the input system in the two-dimensional action mode is similar to that of the prior art fighting game. If a completely new input system is provided in the game machine of the present invention, a player skilled in the input system of the prior art two-dimensional action must learn a new operational technique and cannot effectively utilize the skilled technique.

The three-dimensional step action mode will now be described with reference to FIGS. 8A–11. In order to change the input mode only by manipulating the lever, this embodiment is designed to determine the input mode based on the time required to perform one operation of the lever. In other words, the input can be performed in the three-dimensional step action mode if the time-required to move and return the lever to its neutral position is within a predetermined time period.

FIGS. 8A and 8B illustrate the relationship between the lever operation and movement of the game character in the three-dimensional step action mode, and FIG. 9 illustrates the relationship between movement of the game character on the plane in the three-dimensional space and directions on the screen. In the three-dimensional step action mode, the game character which is on the plane in the three-dimensional space is moved rightward and leftward, and also toward the depth and the front on the screen, as shown in FIG. 9.

A table 320 of FIG. 8A illustrates the relationship between the lever operation and movement of the game character in the three-dimensional step action mode. Arrows 322–329 in the table 320 indicate the directions of lever operation by the player.

When the lever 210 is in its neutral position, the game character is at the ready. As the lever 210 is momentarily moved in the rightward direction (322), a game character 330 steps forward. The term "step" herein means that the game character rapidly moves one or a few steps in any specified direction. The term "forward" herein means a direction (352) toward an enemy game character 340 on the plane of FIG. 9, that is, rightward on the screen. On the contrary, as the lever 210 is momentarily moved in the leftward direction (323), the game character 230 steps backward. The term "backward" herein means a direction (354) away from the enemy game character 240 on the plane of FIG. 9, that is, leftward on the screen.

As the lever 210 is momentarily moved in the forward direction (324) (or as the lever is tilted in the opposite direction to the player), the game character 330 steps toward the depth on the screen. "Toward the depth on the screen" herein means a direction (356) on the plane of FIG. 9. On the contrary, as the lever 210 is momentarily moved in the backward direction (325) (or as the lever is tilted toward the player), the game character 330 steps toward the front on the screen. "Toward the front on the screen" herein means a direction (358) on the plane of FIG. 9.

As the lever 210 is momentarily moved in the right forward direction (326) or in the left forward direction (327), the game character 330 steps toward the depth on the screen. As the lever 210 is momentarily moved in the right backward direction (328) or in the left backward direction (329), the game character 330 steps toward the front on the screen (see FIGS. 8A and 8B).

In the three-dimensional step action mode, the forward and backward directions for the game character depend on the positional relationship between two game characters. Specifically, the line connecting the two game characters (broken line 370 in FIG. 9) indicates the forward and backward directions. The first axis in FIGS. 8A and 9 is parallel to the line connecting the two game characters. Note that the first axis is set to be parallel to the horizontal directions on the screen by adjusting the position of the virtual camera so that the line connecting the two game characters is parallel to the horizontal directions on the screen at all times.

In the three-dimensional step action mode, therefore, the operation of lever in the left-and-right direction corresponds to the movement of the game character in the left-and-right direction on the screen, and the operation of lever in the back-and-forth direction corresponds to the movement of the game character toward the depth and the front on the screen.

In the three-dimensional step action input mode, the game character 330 can perform three-dimensional offense and defense actions by stepping in the back-and-forth and left-and-right directions relative to the enemy game character 340. Therefore, the player can perform the inputs of the three-dimensional step action only by manipulating the lever (rapidly, if necessary) in the same manner as the inputs of the two-dimensional action of the prior art.

The three-dimensional running input mode which is one of the features of the present invention will now be described with reference to FIGS. 10A–12.

FIGS. 10A, 10B and 10C illustrate the relationship between the lever operation and movement of the game character in the three-dimensional running mode, and FIG. 11 illustrates the relationship between movement of the game character on the plane in the three-dimensional space and directions on the screen.

In order to change the input mode only by operation of the lever, this embodiment is designed to determine the input mode based on whether or not a predetermined operation of the lever is carried out within a predetermined time period. More particularly, the input mode is changed to the three-dimensional running mode when the lever is momentarily manipulated in the same manner as in FIG. 8B, as shown in FIG. 10B and again moved in the same direction and held at that position; as shown in FIG. 10C.

The three-dimensional running mode is an input mode in which the game character can be moved on the plane in the three-dimensional space as in the three-dimensional step action mode. However, the game character in the three-dimensional running mode can freely move about on the plane, although the game character in the three-dimensional step action mode can take only one or a few steps on the plane.

A table 420 in FIG. 10A illustrates the relationship between the lever operation and movement of the game character in the three-dimensional running mode. Arrows 422–429 in the table 420 indicate the directions of lever operation by the player.

As the player manipulates the lever 210 two times in the rightward direction and holds the lever in the rightward position (422), a game character 430 runs forward or in a direction (452) toward an enemy game character on the plane of FIG. 11. On the contrary, as the player manipulates the lever 210 two times in the leftward direction and holds the lever in the leftward position (423), the game character 430 runs backward or in a direction (453) away from the enemy game character on the plane of FIG. 11.

As the player manipulates the lever 210 two times forward (or in the opposite direction to the player) and holds the lever in the forward position (424), the game character 430 on the plane of FIG. 11, runs in the leftward direction (454) relative to the enemy game character or toward the depth on the screen. On the contrary, as the player manipulates the lever 210 two times backward (or toward the player) and holds the lever in the backward position (425), the game character 340 on the plane of FIG. 11 runs in the rightward direction (455) relative to the enemy game character or toward the front on the screen.

The game character runs in the direction of two continuous operations of the lever by the player in the three-dimensional running mode. When the player manipulates the lever 210 two times in the right forward direction (426) and holds the lever at that position, the game character on the plane of FIG. 11 runs in the left forward direction (456) relative to the enemy game character. Similarly, when the player manipulates the lever 210 two times in the left forward direction (427) and holds the lever at that position, the game character on the plane of FIG. 11 runs in the left backward direction (457) relative to the enemy game character. When the player manipulates the lever 210 two times in the right backward direction (428) and holds the lever at that position, the game character on the plane of FIG. 11 runs in the right forward direction (458) relative to the enemy game character. When the player manipulates the lever 210 two times in the left backward direction (429) and holds the lever at that position, the game character on the plane of FIG. 11 runs in the right backward direction (459) relative to the enemy game character.

In the three-dimensional running mode, the forward and backward directions for the game character are similar to those in the three-dimensional step action mode. More particularly, the forward and backward directions depend on the positional relationship between two game characters, and the line connecting the two game characters (broken line 470 in FIG. 11) indicates the forward and backward directions. The first axis in FIGS. 10A and 11 is parallel to the line connecting the two game characters. Note that the first axis is usually set to be parallel to the horizontal directions on the screen by adjusting the position of the virtual camera so that the line connecting the two game characters is parallel to the horizontal directions on the screen at all times.

In the three-dimensional running mode, therefore, the operation of lever in the left-and-right direction corresponds to the movement of the game character in the left-and-right direction on the screen, and the operation of lever in the back-and-forth direction corresponds to the movement of the game character toward the depth and the front on the screen.

Figure 12:
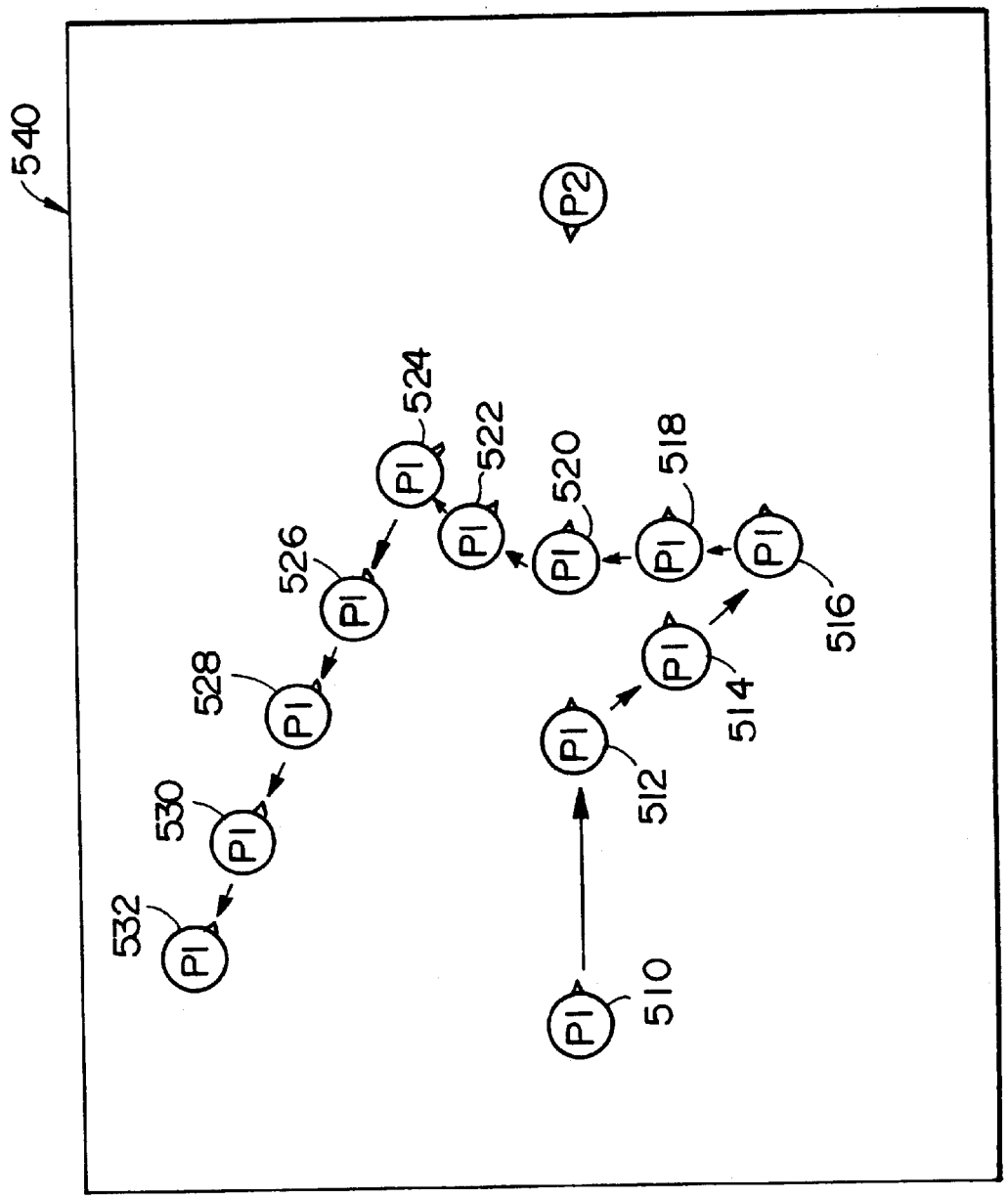
FIG. 12 illustrates movement of the game character which can be freely moved.

FIG. 12 illustrates the relationship between the lever operation and movement of game characters P1, P2 when one game character P1 fights against the other or enemy game character P2 while freely moving about on the plane.

As the player manipulates the lever two times rightward direction and holds the lever at the rightward position in the three-dimensional running mode, the game character P1 runs toward the enemy game character P2 (510, 512). As the player then manipulates the lever two times in the right backward direction and holds the lever at that position, the game character P1 runs in the right forward direction relative to the enemy game character P2 (514, 516). As the player then manipulates the lever two times forward and holds the lever at that position, the game character P1 runs toward the depth on the screen (518, 520). As the player then manipulates the lever two times in the right forward direction and holds the lever at that position, the game character P1 runs in the left forward direction relative to the enemy game character P2 (522, 524). As the player then manipulates the lever two times in the leftward direction and holds the lever at that position, the game character P1 runs in the backward direction relative to the enemy game character P2 (526, 528, 530, 532).

As shown in FIG. 12, the game character P1 can freely move about on the plane 540 in the three-dimensional running mode.

In the game machine of this embodiment, the inputs of offense and defense can be performed by manipulating the buttons and others on the operating section in the three-dimensional running mode.

Figure 13A:
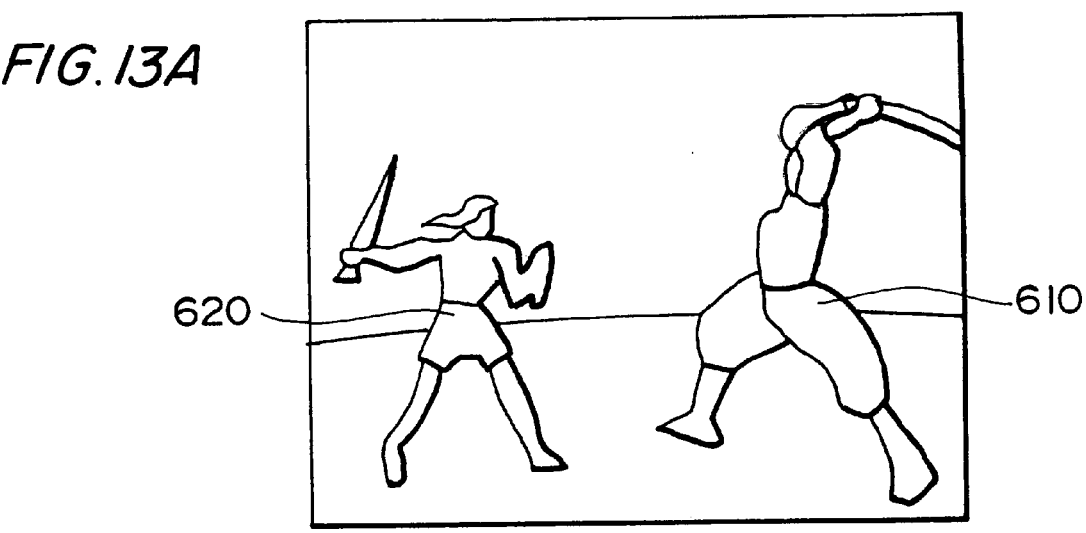
FIGS. 13A, 13B and 13C illustrate motions of the game character.
Figure 13B:
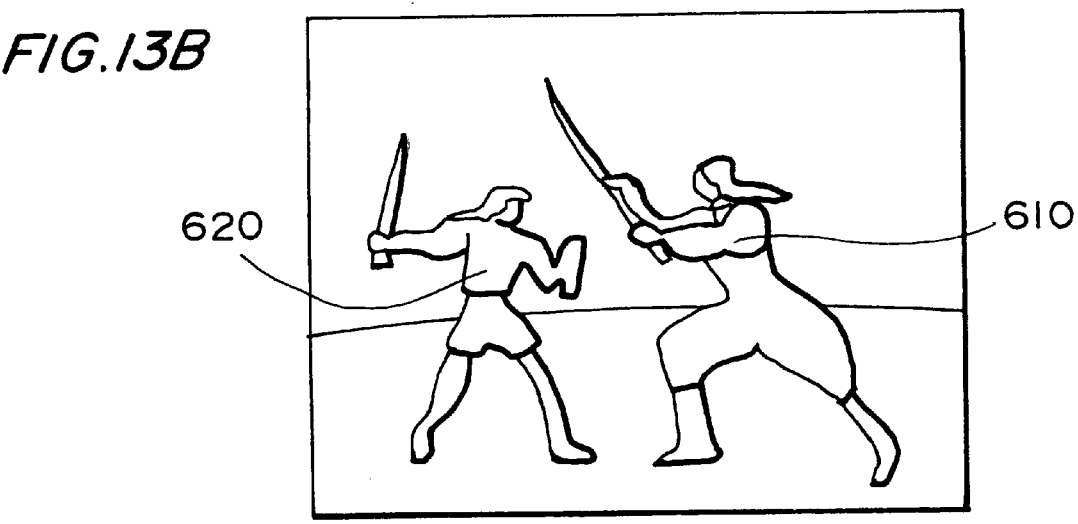
Figure 13C:
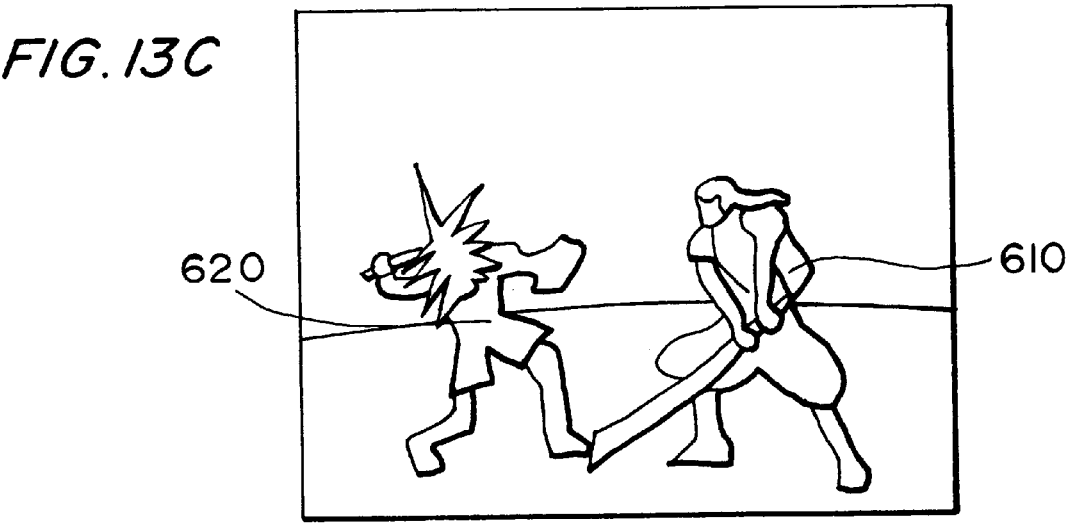

FIGS. 13A, 13B and 13C illustrate such a state that a game character 610 attacks another game character 620. The game character 610 can freely move about on the plane, ensure its advantageous position relative to the enemy game character and attack the enemy game character based on the player's manipulation of the buttons and others in the three-dimensional running mode, as shown in FIGS. 13A, 13B and 13C.

Figure 14A:
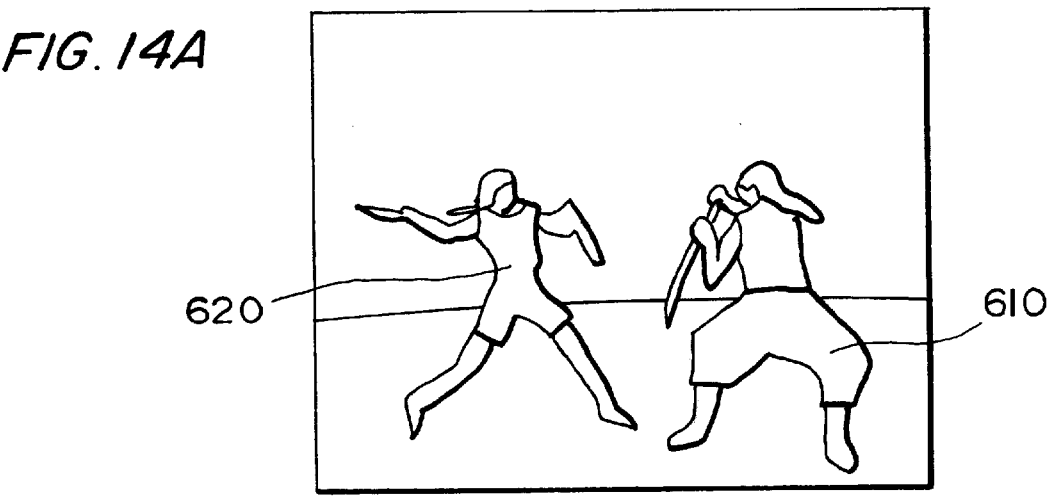
FIGS. 14A, 14B and 14C illustrate motions of the game character.
Figure 14B:
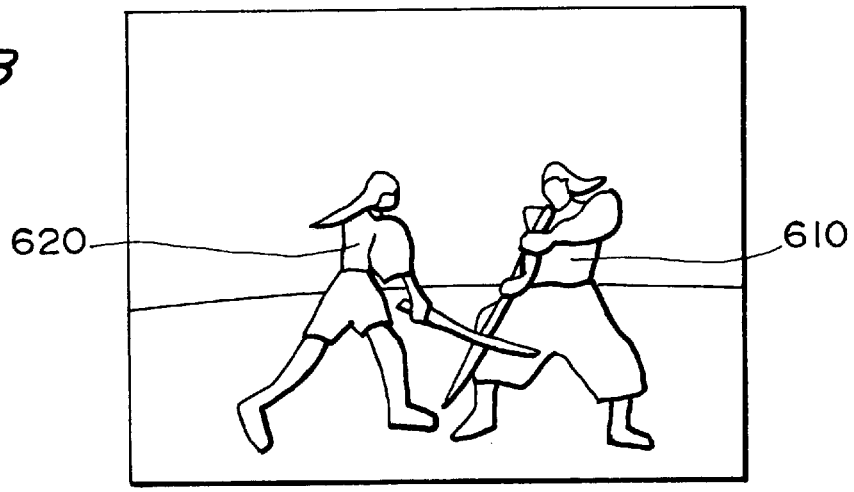
Figure 14C:
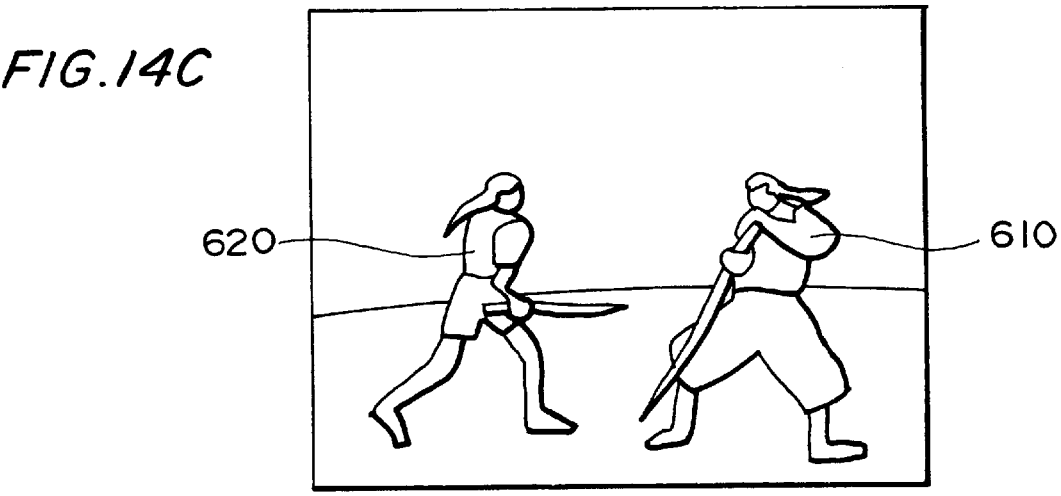

FIGS. 14A, 14B and 14C illustrate such a state that the game character 610 defends itself from the attack of the enemy game character 620. When the game character 610 is attacked by the enemy game character 620 while freely moving about on the plane in the three-dimensional running mode, the player can manipulate the buttons and others to defend the game character from the attack of the enemy game character 620, as shown in FIGS. 14A, 14B, and 14C.

Figure 16:
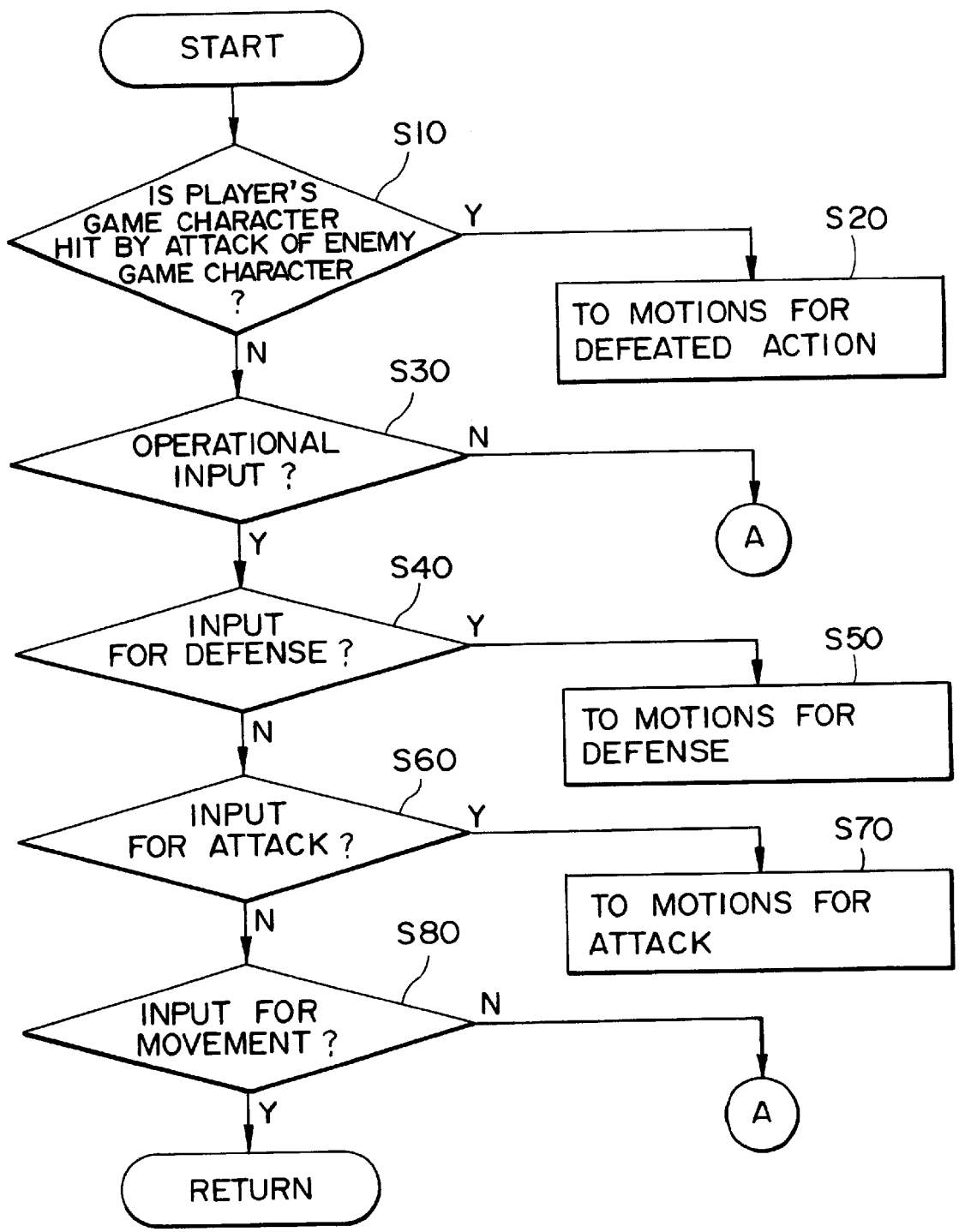
FIG. 16 is a flowchart illustrating another example of processing in the embodiment of the present invention.

FIGS. 15 and 16 are flowcharts illustrating the processing for switching the input mode in this embodiment. FIG. 15 shows a flowchart of the main routine and FIG. 16 shows a flowchart of the action determination sub-routine.

The main routine judges mainly the input mode based on the lever input and determines motions according to the input mode. The motion determination sub-routine judges the action to be performed by the game character based on the inputs from the lever and buttons in the operating section, and then determines optimum motions for the judged action.

When the lever is in its neutral position, motions for the ready position as shown in FIG. 4 is reproduced (step M10). The process then jumps to the motion determination sub-routine in which optimum motions are determined (step M20).

The process of the motion determination sub-routine will be described below.

In the motion determination sub-routine, it is first judged whether or not the attack of the enemy game character has hit the player's game character (step S10). If it is judged that the player's game character has been hit by the attack of the enemy game character, motions for a defeated action are carried out (step S20). If not, it is then judged whether or not an operational input has been performed (step S30). If there is no operational input, the process returns to A. If there is an operational input, it is then judged whether or not the input is an input for defense. If the operational input is an input for defense, motions for defense are performed (steps S40 and S50). If the operational input is an input for attack, motions for attack are performed (steps S60 and S70). If the operational input is an input for movement, the process returns to the main routine (step S80).

The main routine changes motions and reproduces initiation motions for movement (step M30).

The process jumps to the motion determination sub-routine for any input performed during reproduction of the initiation motions for movement (step M40).

If an input for movement is performed through the lever, the process again returns to the main routine in which it is judged whether or not the lever operation is released within 10 frames after the start of motion reproduction (step M50). If not released, the main routine judges that the input mode is the two-dimensional action mode and changes motions to reproduce motions for the two-dimensional action (step M120). Thereafter, the process again jumps to the motion determination sub-routine (step M130). If there is an input for movement by the lever, the process again returns to the main routine wherein motions for the two-dimensional action are continuously performed (step M140).

If the lever operation is released within 10 frames after the start of motion reproduction, the main routine judges that the input mode is the three-dimensional step action mode, and then changes motions to reproduce motions for the three-dimensional step action (step M60). Thereafter, the process again jumps to the motion determination sub-routine (step M70). If an input for movement is performed through the lever, the process again returns to the main routine wherein it is judged whether or not the lever has been again moved in the same direction within 15 frames after the start of motion reproduction (step M80). If not moved, the main routine judges that the input mode is the three-dimensional step action mode and continuously performs motions for the three-dimensional step action (step M150).

If the lever has been moved in the same direction within 15 frames after the start of motion reproduction, the main routine judges that the input mode is the three-dimensional running mode, and then changes motions to reproduce motions for the three-dimensional running action (step M90). Thereafter, the process again jumps to the motion determination sub-routine (step M100). If there is an input for movement through the lever, the process again returns to the main routine wherein motions for the three-dimensional running action are continuously performed (step M110).

Figure 17:
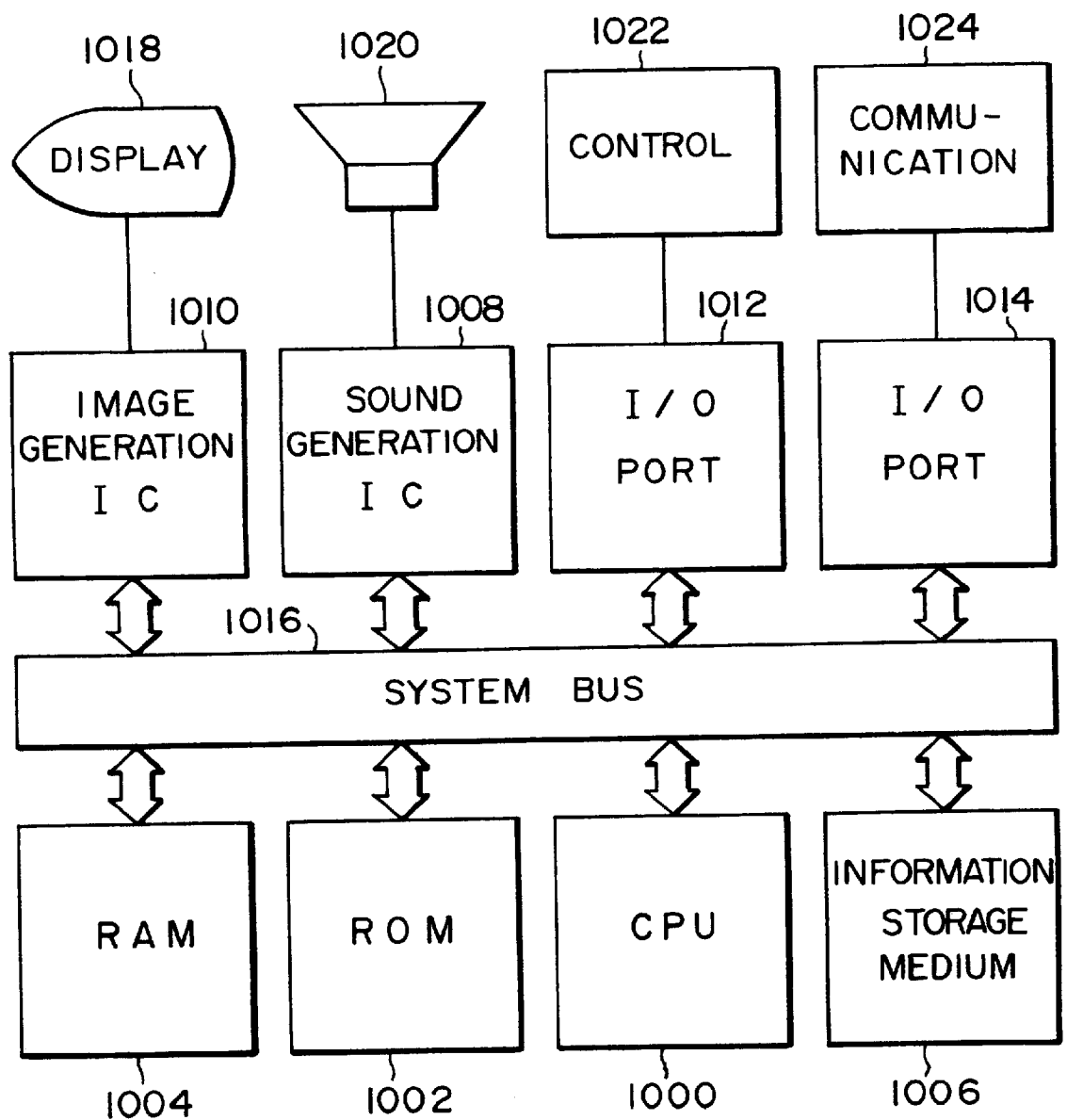
FIG. 17 shows a structure of hardware which can realize the embodiment of the present invention.

A structure of hardware which can realize this embodiment of the present invention will be described with reference to FIG. 17. The structure of FIG. 17 comprises CPU 1000, ROM 1002, RAM 1004, an information storage medium 1006, a sound generation IC 1008, an image generation IC 1010 and I/O ports (1012, 1014), all of which are interconnected for data send/receive through a system bus 1016. The image generation IC 1010 is connected to a display 1018. The sound generation IC 1008 is connected to a speaker 1020. One of the I/O ports 1012 is connected to a control device 1022 while the other I/O port 1014 is connected to a communication device 1024.

The information storage medium 1006 stores mainly a program, image information for representing objects to be displayed and sound information. The information storage medium 1006 may take any of various forms such as CD-ROM, game cassette, IC card, DVD, MO, FD, memory, hard disk and so on. For domestic game machines, the information storage medium for storing a game program or other information may take any form of CD-ROM, game cassette, DVD and others. For arcade game machines, a memory such as ROM may be utilized. In this case, the information storage medium 1006 is ROM 1002.

The control device 1022 corresponds to a game controller or control panel and designed for a player to input the result of player's judgement in accordance with the progress of game into the machine.

CPU 1000 is designed to control the entire game system and to process various data in accordance with the program stored in the information storage medium 1006, a system program (such as initialization information for the machine) stored in the ROM 1002 and signals from the control device 1022. RAM 1004 is a memory means which is used as a working area for the CPU 1000 and designed to store the contents of the information storage medium 1006 and ROM 1002 or the results of computation in the CPU 1000. The information of motions will be stored in the RAM or information storage medium.

The sound and image generation IC's 1008, 1010 are used to output the optimum sounds and images for game. The sound generation IC 1008 is in the form of an integrated circuit for generating game sounds such as sound effects, background music, based on the information stored in the information storage medium 1006 and ROM 1002. The generated game sounds are outputted through the speaker 1020. The image generation IC 1010 is in the form of an integrated circuit for generating image information to be outputted toward the display 1018 based on image information fed from the RAM 1004, ROM 1002 and information storage medium 1006. The display 1018 may be a so-called head-mount display (HMD).

The communication device 1024 is designed to transfer various information utilizable in the game machine to or from the outside. The communication device 1024 is connected to the other game machines for sending and receiving given information according to the game program or for sending and receiving information such as game program through a communication line.

Various processing described in connection with FIGS. 1 to 16 may be realized by use of the information storage medium 1006 which stores a program for performing a given process, CPU 1000 operable according to the program, image generation IC 1010, sound generation IC 1008 and others. The processing carried out by the image and sound generation IC's 1010, 1008 may be performed in software by the CPU 1000 or any general-purpose DSP or the like.

Figure 18A:
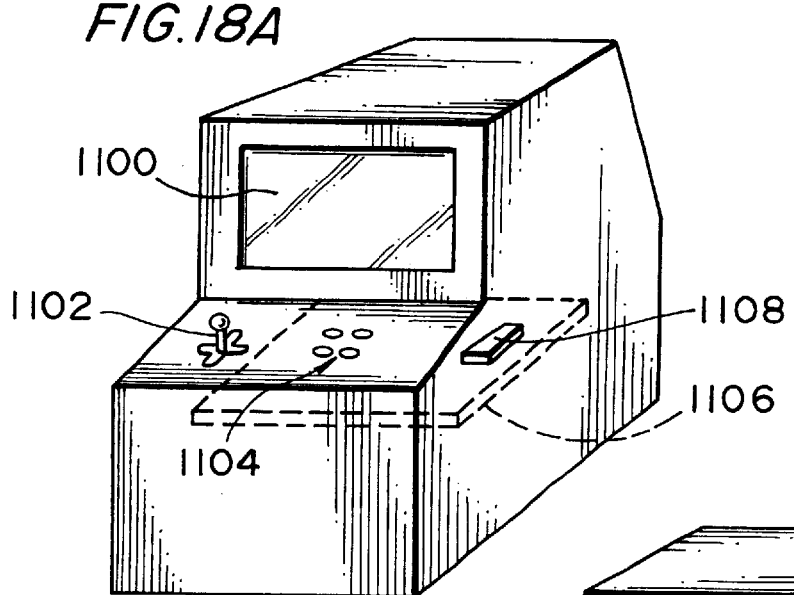
FIGS. 18A, 18B and 18C show various forms of devices to which the present invention can be applied.

FIG. 18A shows an arcade game machine to which this embodiment of the present invention is applied. In the game machine, a player can enjoy a game by manipulating a lever 1102 and buttons 1104 while viewing the game image on a display 1100. The game machine comprises a built-in IC substrate 1106 on which CPU, image and sound generation IC's and others are mounted. The system substrate 1106 also includes a memory 1108 which is an information storage medium designed to store information for determining the input mode based on operational information from a given operating means and information for changing and reproducing various motions based on the input mode. The information mentioned just above will be referred to "stored information". The stored information includes at least one of program codes for performing various processes mentioned above, image information, sound information, information of shape of the objects to be displayed, table data, list data, information of player and so on.

Figure 18B:
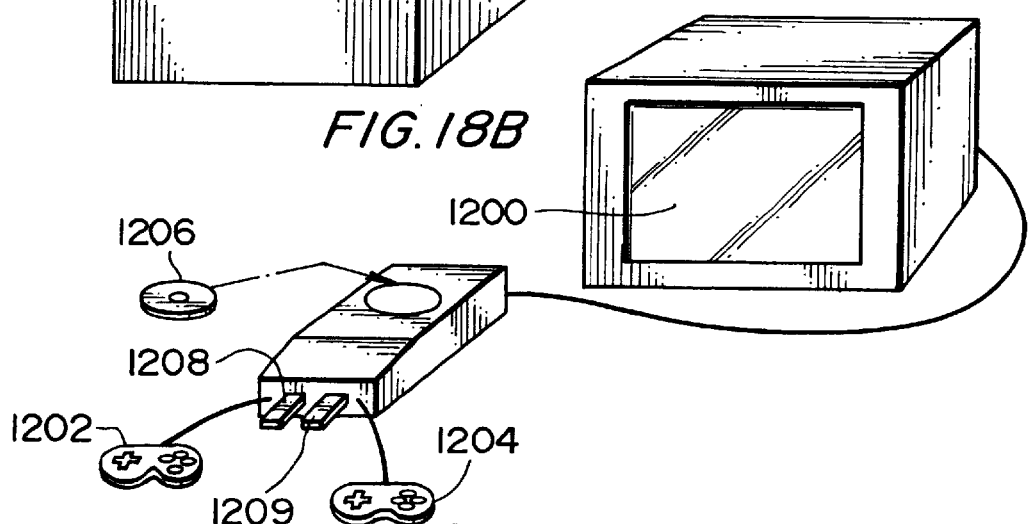

FIG. 18B shows a domestic game machine to which this embodiment of the present invention is applied. In this game machine, a player can enjoy a game by manipulating game controllers 1202 and 1204 while viewing the game image on a display 1200. In this case, the stored information is included in a CD-ROM 1206 and IC cards 1208, 1209, all of which are information storage media detachably mounted in the game machine body.

Figure 18C:
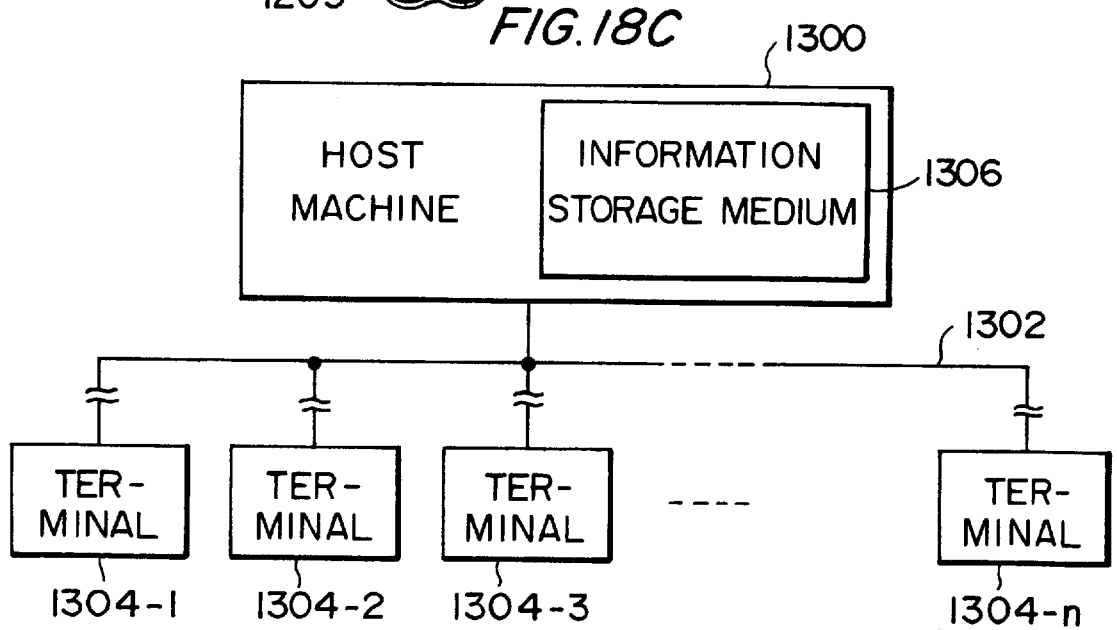

FIG. 18C shows a game system to which this embodiment of the present invention is applied. The game system comprises a host device 1300 and terminals 1304-1 to 1304-n connected to the host device 1300 through a communication line 1302. In such a case, the stored information may be included in an information storage medium 1306 which is any one of magnetic disc, magnetic tape and memory which can be controlled by the host device 1300. If each of the terminals 1304-1 to 1304-n is a stand-alone machine having CPU and image and sound generation IC's for generating game images and sounds, the host device 1300 delivers game programs and others necessary for generating game images and sounds to the respective terminals 1304-1 to 1304-n. On the other hand, if each terminal is not a stand-alone machine, the hose device 1300 itself may generate game images and sounds which are in turn transmitted to the respective terminals 1304-1 to 1304-n.

The present invention is not limited to the illustrated embodiment, but may be carried out in any one of various modifications.

Although the present invention has been described as to the lever used for switching the input mode and for inputting the action of the game character, it is not limited to such an arrangement. For example, the lever may be replaced by a button, mouse or other operating means.

Although the present invention has been described as to the lever for switching the input mode, it is not limited to such an arrangement. For example, the lever may be combined with any other suitable operating means such as button or the like to switch the input mode.

Although the present invention has been described as to the first axis variable depending on the positional relationship between two game characters, it is not limited to such an arrangement. For example, the three axes may be defined based on X-, Y- and Z-axes in the three-dimensional space.

Although the present invention has been described as to the fighting game, it is not limited to the fighting game. The present invention may broadly be applied to any other action game in which game characters are moved within a three-dimensional space.

In addition to the domestic and arcade game systems, the present invention may be applied to any one of various other game systems such as simulators, large-scaled attraction systems in which a lot of players can enter a game, personal computers, multimedia terminals, system substrates for generating game images and so on.

What is claimed is:

1. A game machine for a game in which a plurality of game characters including first and second game characters can move in a three-dimensional space specified by three axes, that is, first, second and third axes, said game machine comprising:

action input means which has a plurality of input modes including first and second input modes and inputs an action of the game characters by changing an input mode;

action computation means for computing movement of the game characters in a direction of the first and a direction of the second axes based on an input from said action input means in the first input mode, and for computing movement of the game characters in a direction of the first and a direction of the third axes based on an input from said action input means in the second input mode; and image generation means for generating an image to be displayed on a display section based on movement of the game characters computed by said action computation means, wherein said action computation means judges the input mode based on whether a time required to perform one operation in said action input means is within a given time period.

2. The game machine as defined in claim 1, wherein the first axis is set based on horizontal directions on a screen of said display section;

wherein the second axis is set based on vertical directions on the screen of said display section; and wherein the third axis is set based on the directions of a depth and a front on the screen of said display section.

3. The game machine as defined in claim 1, wherein said image generation means generates an image by switching data of motions based on change of the input mode.

4. The game machine as defined in claim 1, wherein said action input means is a lever which can be manipulated at least forward, backward, rightward and leftward directions or can be manipulated pivotally.

5. A game machine for a game in which a plurality of game characters including first and second game characters can move in a three-dimensional space specified by three axes, that is, first, second and third axes, said game machine comprising:

action input means which has a plurality of input modes including first and second input modes and inputs an action of the game characters by changing an input mode;

action computation means for computing movement of the game characters in a direction of the first and a direction of the second axes based on an input from said action input means in the first input mode, and for computing movement of the game characters in a direction of the first and a direction of the third axes based on an input from said action input means in the second input mode; and image generation means for generating an image to be displayed on a display section based on movement of the game characters computed by said action computation means, wherein said action computation means judges the input mode based on whether or not a predetermined operation is performed within a predetermined time period in said action input means.

6. A game machine for a game in which a plurality of game characters including first and second game characters can move in a three-dimensional space specified by three axes, that is, first, second and third axes, said game machine comprising:

action input means which has a plurality of input modes including first and second input modes and inputs an action of the game characters by changing an input mode;

action computation means for computing movement of the game characters in a direction of the first and a direction of the second axes based on an input from said action input means in the first input mode, and for computing movement of the game characters in a direction of the first and a direction of the third axes based on an input from said action input means in the second input mode; and image generation means for generating an image to be displayed on a display section based on movement of the game characters computed by said action computation means, wherein the first axis is set based on a positional relationship between the first and second game characters and each of the second and third axes is set to be perpendicular to the first axis.

7. The game machine as defined in claim 6, wherein a game in which the first and second game characters fight against each other can be played;

wherein said action input means inputs movement of a game character in vertical, forward and backward directions including advance to and retreat from the other game character in the first input mode; and wherein said action input means inputs movement of a game character on a plane in the three-dimensional space in the second input mode.

8. The game machine as defined in claim 7, further comprising second action input means for inputting an action of a game character, wherein said second action input means inputs at least one of jump, crouching, attack and defense actions of a game character in the second input mode.

9. The game machine as defined in claim 6, wherein said first input mode is a two-dimensional input mode, the game character is moved in horizontal and vertical directions on a game screen, and said second input mode is that the game character which is on a plane in the three-dimensional space is moved rightward and leftward, and also toward a depth and a front on the plane.

10. A computer-readable information storage medium for controlling a game machine for a game in which a plurality of game characters including first and second game characters can move in a three-dimensional space specified by three axes, that is, first, second and third axes, said information storage medium comprising information for realizing:

action input means which has a plurality of input modes including first and second input modes and inputs an action of the game characters by changing an input mode;

action computation means for computing movement of the game characters in a direction of the first and a direction of the second axes based on an input from said action input means in the first input mode, and for computing movement of the game characters in a direction of the first and a direction of the third axes based on an input from said action input means in the second input mode; and image generation means for generating an image to be displayed on a display section based on movement of the game characters computed by said action computation means, further including information necessary for said action computation means to judge the input mode based on whether a time required to perform one operation in said action input means is within a given time period.

11. The information storage medium as defined in claim 10, further including information necessary for setting the first axis based on horizontal directions on a screen of said display section, for setting the second axis based on vertical directions on the screen of said display section, and for setting the third axis based on the directions of a depth and a front on the screen of said display section.

12. The information storage medium as defined in claim 11, further including:

information necessary to realize second action input means for inputting an action of a game character; and information necessary for said second action input means to input at least one of jump, crouching, attack and defense actions of a game character in the second input mode.

13. The information storage medium as defined in clam 10, further including information necessary for said image generation means to generate an image by switching data of motions based on change of the input mode.

14. The information storage medium as defined in claim 11, further including:

information necessary for performing a game in which the first and second game characters fight against each other; and information necessary for said action input means to input movement of a game character in vertical, forward and backward directions including advance to and retreat from the other game character in the first input mode and to input movement of a game character on a plane in the three-dimensional space in the second input mode.

15. A computer-readable information storage medium for controlling a game machine for a game in which a plurality of game characters including first and second game characters can move in a three-dimensional space specified by three axes, that is, first, second and third axes, said information storage medium comprising information for realizing:

action input means which has a plurality of input modes including first and second input modes and inputs an action of the game characters by changing an input mode;

action computation means for computing movement of the game characters in a direction of the first and a direction of the second axes based on an input from said action input means in the first input mode, and for computing movement of the game characters in a direction of the first and a direction of the third axes based on an input from said action input means in the second input mode; and image generation means for generating an image to be displayed on a display section based on movement of the game characters computed by said action computation means, further including information necessary for said action computation means to judge the input mode based on whether or not a predetermined operation is performed within a predetermined time period in said action input means.

16. A computer-readable information storage medium for controlling a game machine for a game in which a plurality of game characters including first and second game characters can move in a three-dimensional space specified by three axes, that is, first, second and third axes, said information storage medium comprising information for realizing:

action input means which has a plurality of input modes including first and second input modes and inputs an action of the game characters by changing an input mode;

action computation means for computing movement of the game characters in a direction of the first and a direction of the second axes based on an input from said action input means in the first input mode, and for computing movement of the game characters in a direction of the first and a direction of the third axes based on an input from said action input means in the second input mode; and image generation means for generating an image to be displayed on a display section based on movement of the game characters computed by said action computation means, further including information necessary for setting the first axis based on a positional relationship between the first and second game characters, and for setting each of the second and third axes to be perpendicular to the first axis.

17. The game machine as defined in claim 16, wherein said first input mode is a two-dimensional input mode, the game character is moved in horizontal and vertical directions on a game screen, and said second input mode is that the game character which is on a plane in the three-dimensional space is moved rightward and leftward, and also toward a depth and a front on the plane.

18. A game machine for a game in which a plurality of game characters including first and second game characters can move in a three-dimensional space specified by three axes, that is, first, second and third axes, said game machine comprising:

action input means which has a plurality of input modes including first and second input modes and inputs an action of the game characters by changing an input mode;

action computation means for computing movement of the game characters in a direction of the first and a direction of the second axes based on an input from said action input means in the first input mode, and for computing movement of the game characters in a direction of the first and a direction of the third axes based on an input from said action input means in the second input mode; and image generation means for generating an image to be displayed on a display section based on movement of the game characters computed by said action computation means, wherein said first input mode is a two-dimensional input mode, and said second input mode comprises two three-dimensional modes, including a three-dimensional step input mode and a three-dimensional running input mode.

19. A computer-readable information storage medium for controlling a game machine for a game in which a plurality of game characters including first and second game characters can move in a three-dimensional space specified by three axes, that is, first, second and third axes, said information storage medium comprising information for realizing:

action input means which has a plurality of input modes including first and second input modes and inputs an action of the game characters by changing an input mode;

action computation means for computing movement of the game characters in a direction of the first and a direction of the second axes based on an input from said action input means in the first input mode, and for computing movement of the game characters in a direction of the first and a direction of the third axes based on an input from said action input means in the second input mode; and image generation means for generating an image to be displayed on a display section based on movement of the game characters computed by said action computation means, wherein said first input mode is a two-dimensional input mode, and said second input mode comprises two three-dimensional modes, including a three-dimensional step input mode and a three-dimensional running input mode.

20. A game machine for a game in which a plurality of game characters including first and second game characters can move in a three-dimensional space specified by three axes, that is, first, second and third axes, said game machine comprising:

action input means which has a plurality of input modes including first and second input modes and inputs an action of the game characters by changing an input mode;

action computation means for computing movement of the game characters in a direction of the first and a direction of the second axes based on an input from said action input means in the first input mode, and for computing movement of the game characters in a direction of the first and a direction of the third axes based on an input from said action input means in the second input mode; and image generation means for generating an image to be displayed on a display section based on movement of the game characters computed by said action computation means, wherein the input mode is determined using a time required to perform an operation of said action input mode.

21. A computer-readable information storage medium for controlling a game machine for a game in which a plurality of game characters including first and second game characters can move in a three-dimensional space specified by three axes, that is, first, second and third axes, said information storage medium comprising information for realizing:

action input means which has a plurality of input modes including first and second input modes and inputs an action of the game characters by changing an input mode;

action computation means for computing movement of the game characters in a direction of the first and a direction of the second axes based on an input from said action input means in the first input mode, and for computing movement of the game characters in a direction of the first and a direction of the third axes based on an input from said action input means in the second input mode; and image generation means for generating an image to be displayed on a display section based on movement of the game characters computed by said action computation means, wherein the input mode is determined using a time required to perform an operation of said action input mode.

* * * * *